May 27, 1952  R. A. CHRISTIAN ET AL  2,597,973
RECORD CONTROLLING MEANS FOR ACCOUNTING MACHINES
Filed July 2, 1948  5 Sheets-Sheet 1
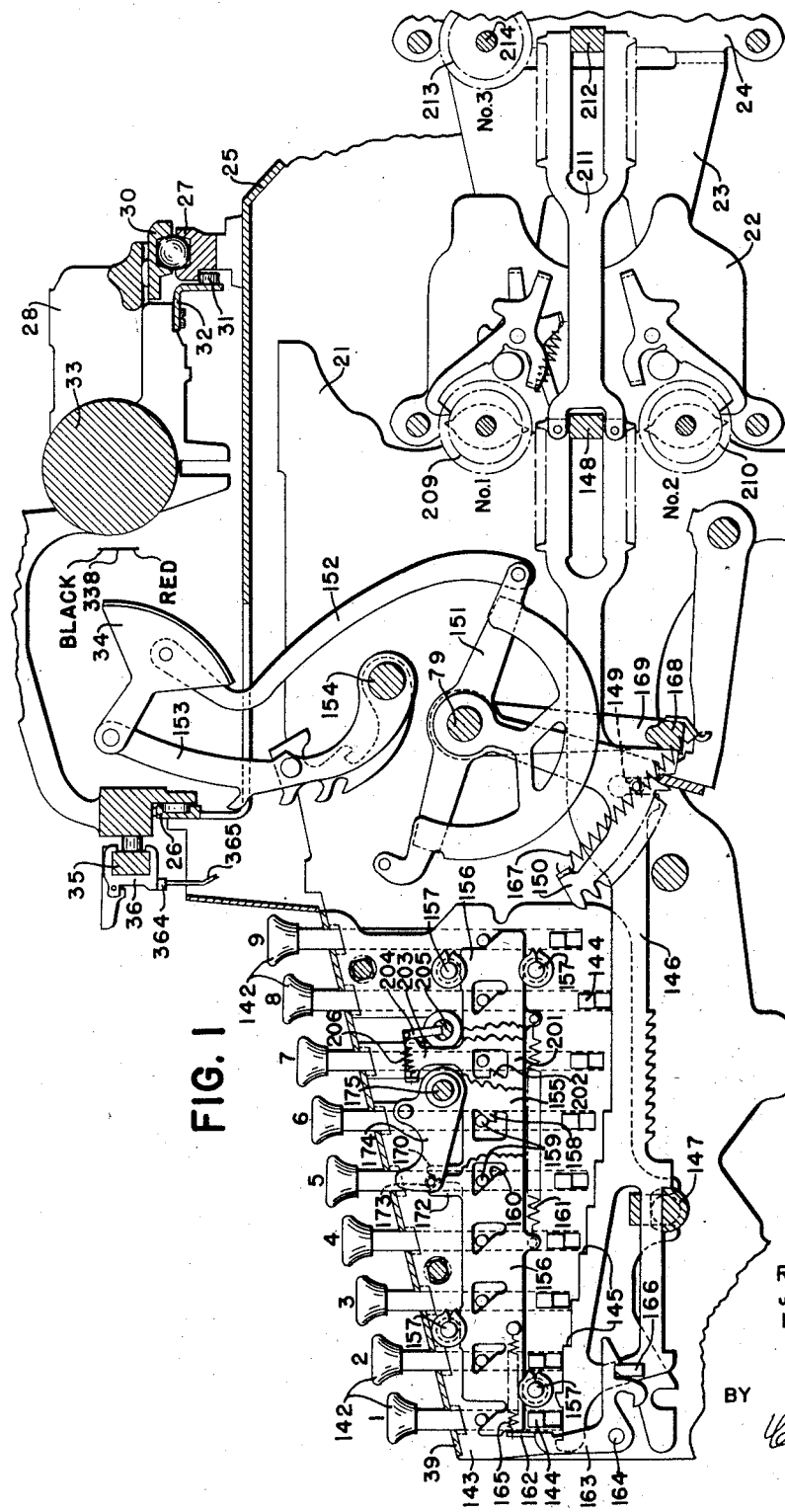
RAYMOND A. CHRISTIAN
JESSE R. GANGER AND
HENRY F. LANG
Inventors
BY
Carl Benst
THEIR Attorney May 27, 1952  R. A. CHRISTIAN ET AL  2,597,973
RECORD CONTROLLING MEANS FOR ACCOUNTING MACHINES
Filed July 2, 1948  5 Sheets-Sheet 2
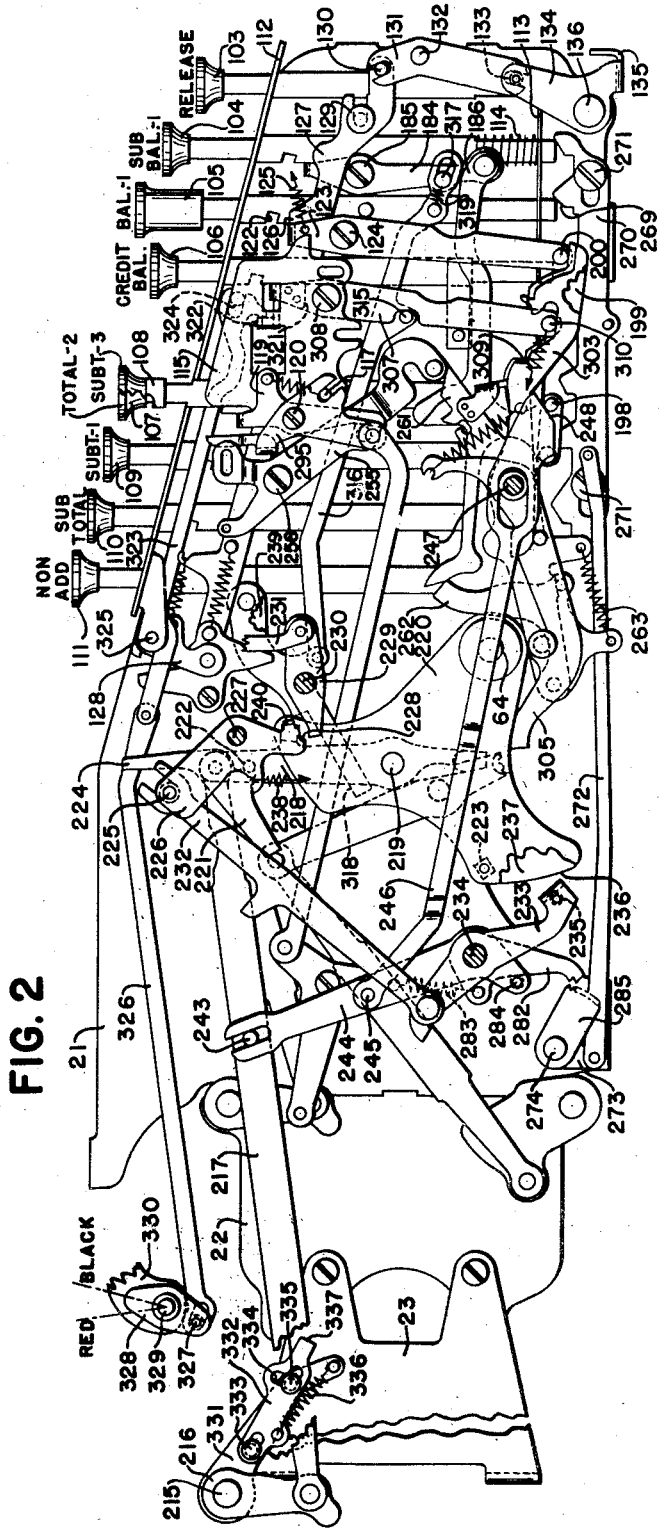
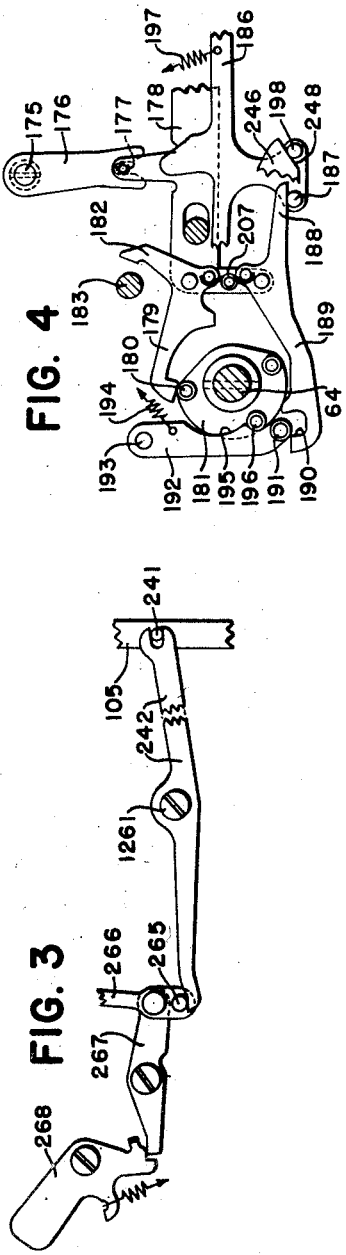
RAYMOND A. CHRISTIAN
JESSE R. GANGER AND
HENRY F. LANG
Inventors
BY *Carl Beust*
THEIR Attorney May 27, 1952  R. A. CHRISTIAN ET AL  2,597,973
RECORD CONTROLLING MEANS FOR ACCOUNTING MACHINES
Filed July 2, 1948  5 Sheets-Sheet 3
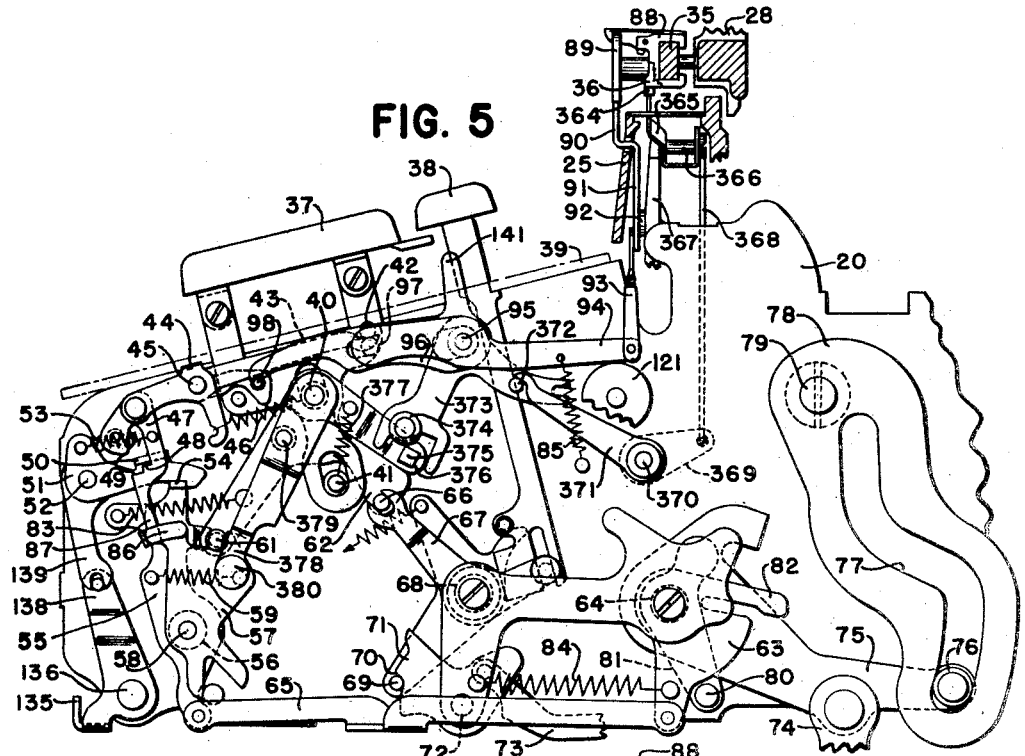
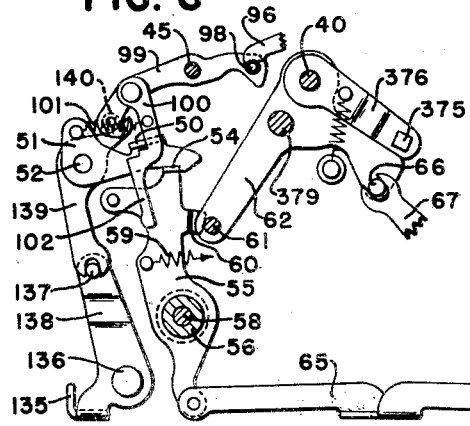
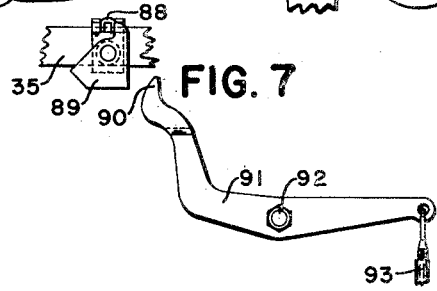
RAYMOND A. CHRISTIAN
JESSE R. GANGER AND
HENRY F. LANG
Inventors
BY Karl Beust
THEIR Attorney

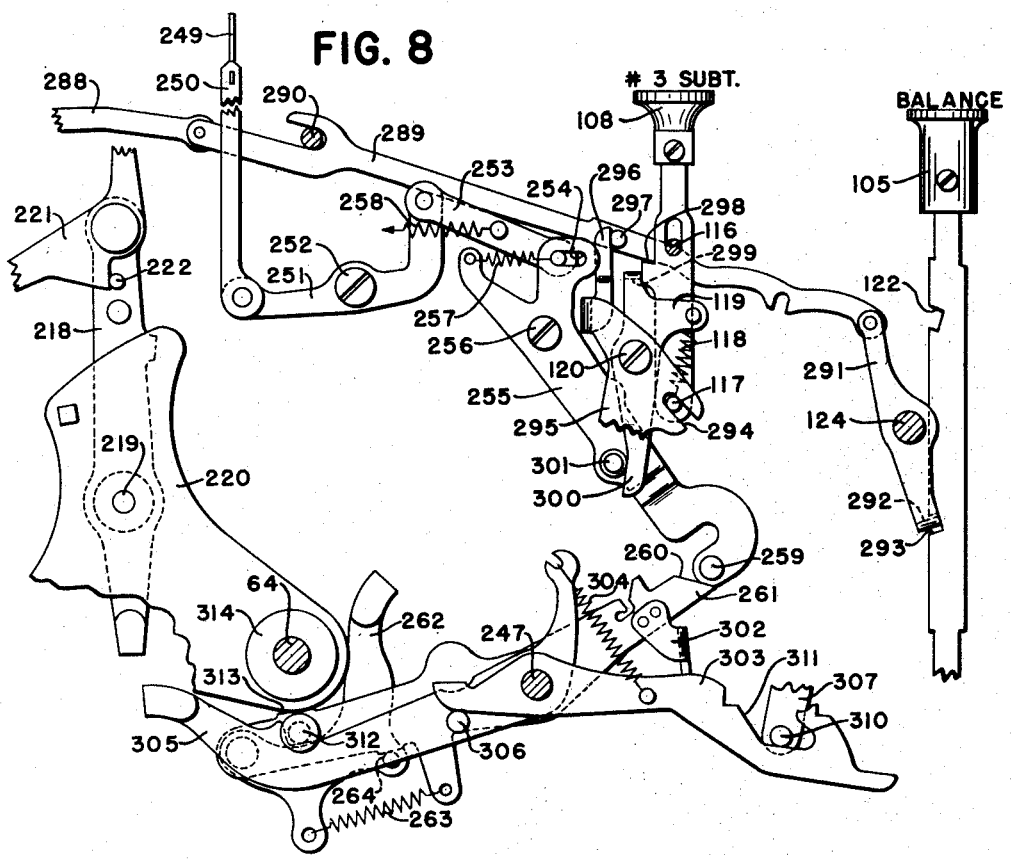
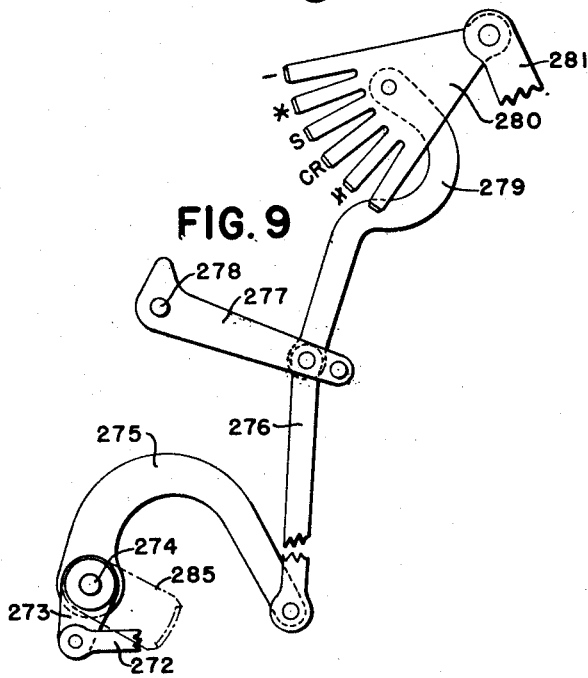

May 27, 1952 R. A. CHRISTIAN ET AL 2,597,973
RECORD CONTROLLING MEANS FOR ACCOUNTING MACHINES
Filed July 2, 1948 5 Sheets-Sheet 5

FIG. 10

(CUSTOMER) 340 — ANY MEAT CO. IN ACCOUNT WITH A. Retailer
TERMS WEEKLY

MAY 10 YB  20.00
MAY 11 RS  30.00 —
MAY 12 CD  40.00 —
MAY 13 DS  50.00 —
MAY 14 MO  10.00 — *
           50.00 *

MAY 10 YB  20.00
MAY 11 RS  30.00 —
MAY 12 CD  40.00 —
MAY 13 MO  50.00 —
MAY 14 DS  10.00 —
           30.00 CR (COLLECTOR) 341 — ANY MEAT CO. IN ACCOUNT WITH A. Retailer
TERMS WEEKLY MAY 10 YB  20.00
MAY 11 RS  30.00 —
MAY 12 CD  40.00 —
MAY 13 DS  50.00 —
MAY 14 MO  10.00 — *
           50.00 *

MAY 10 YB  20.00
MAY 11 RS  30.00 —
MAY 12 CD  40.00 —
MAY 13 MO  50.00 —
MAY 14 DS  10.00 —
           30.00 CR (OFFICE) 342 — ANY MEAT CO. IN ACCOUNT WITH A. Retailer
TERMS WEEKLY MAY 10 YB  20.00
MAY 11 RS  30.00 —
MAY 12 CD  40.00 —
MAY 13 DS  50.00 —
MAY 14 MO  10.00 — *
           50.00 *

MAY 10 YB  20.00
MAY 11 RS  30.00 —
MAY 12 CD  40.00 —
MAY 13 MO  50.00 —
MAY 14 DS  10.00 —
           30.00 CR

PRINTED IN RED

RAYMOND A. CHRISTIAN
JESSE R. GANGER AND
HENRY F. LANG
Inventors

BY Karl Beust
THEIR Attorney

Patented May 27, 1952

2,597,973

UNITED STATES PATENT OFFICE 2,597,973

RECORD CONTROLLING MEANS FOR ACCOUNTING MACHINES

Raymond A. Christian, Jesse R. Ganger, and Henry F. Lang, Dayton, Ohio, assignors to The National Cash Register Company, Dayton, Ohio, a corporation of Maryland Application July 2, 1948, Serial No. 36,694

21 Claims. (Cl. 235—60.31)

The present invention relates in general to accounting or bookkeeping machines and is directed in particular to the mechanism for controlling the functions of such machines.

In many business systems, it is desirable that the record of each transaction or entry be printed once upon each of several detachable or separable portions of a record slip, so that each interested party to the transaction will have an identical and original record of said transaction.

Therefore the general object of this invention is the provision of an improved accounting machine for producing several identical records.

Another object of this invention is to provide an improved type of accounting machine for producing several identical records of each business transaction or entry.

A further object is to provide an accounting machine with improved control mechanism for automatically effecting repeat operations to obtain several identical records of each business entry.

A still further object is the provision of improved control mechanism for accounting machines whereby the record of each transaction or entry is automatically repeated as many times as necessary to obtain several identical and original records of said transaction.

Another object of this invention is to provide a symbol-printing sector, which is positioned under influence of control elements in the first of a series of related machine operations, with means to retain said sector positioned in the succeeding of said series of related operations.

A further object is the provision of means to maintain a two-colored inking ribbon in position to print entries in one color during a series of related machine operations.

With these and incidental objects in view, the invention includes certain novel features of construction and combinations of parts, a preferred form or embodiment of which is hereinafter described with reference to the drawings which accompany and form a part of this specification.

In the drawings:

Fig. 1 is a longitudinal cross-sectional view as observed from the right of the machine and taken just to the right of one of the amount banks, showing the construction of said bank and the mechanism associated therewith.

Fig. 2 is a side elevation as observed from the left of the machine, showing in particular the control bank of keys and the control mechanisms associated therewith.

Fig. 3 is a detail view of the transfer-total linkage between the #1 Balance key and the #3 totalizer.

Fig. 4 is a detail view of a part of the mechanism for controlling the zero stop pawls in repeat operations.

Fig. 5 is a right side elevation showing in particular the mechanism for initiating operation of the machine, and a portion of the main operating mechanism of said machine.

Fig. 6 is a detail view of a part of the machine-releasing mechanism shown in Fig. 5.

Fig. 7 is a detail view of one of the machine release tappets and the release lever associated therewith for initiating an automatic operation of the machine upon movement of the traveling carriage into a predetermined columnar position.

Fig. 8 is an enlarged left side elevation of a portion of the mechanism for controlling the functions of the #3 totalizer.

Fig. 9 is a detail view of the symbol-printing sector and a portion of the linkage for positioning it.

Fig. 10 is a facsimile of a record slip having several similar detachable or separable portions each containing identical printed records of each business transaction or entry.

GENERAL DESCRIPTION

The present invention is shown incorporated in a well-known type of accounting machine, the principal features of which are disclosed in United States Patent No. 2,038,717, issued April 28, 1936, to Raymond A. Christian; Patent No. 2,189,851, issued February 13, 1940, to Paul H. Williams et al.; and Patent No. 2,263,479, issued November 18, 1941, to Paul H. Williams, to which reference may be had for a detailed description of mechanism which it was deemed advisable to explain only in a general way herein.

The present machine is provided with an amount keyboard similar in many respects to the conventional adding machine keyboard and including a plurality of denominational rows of amount keys; one or more rows of symbol-printing keys; several rows of date keys; a row of control keys, some of which are so-called motorized keys for initiating machine operation; and the usual starting bars for initiating machine operation. The amount keys, the symbol keys, and the date keys control the positioning of corresponding actuator racks which in turn position corresponding printing sectors which record the value of the depressed amount keys, the symbol, and the date upon suitable record material supported by a platen roll which is, in turn, mounted in a laterally-shiftable traveling carriage. The traveling carriage is arranged for columnar tabulating movement to aline the various columns of multi-column record material with the printing sectors so that entries may be made therein.

In this particular adaptation, the machine is provided with three totalizers arranged in vertical pairs at the rear of the machine. The upper front or #1 totalizer is an add-subtract totalizer, often referred to as a Balance Totalizer or in some cases as a Crossfooter. The lower front or #2 totalizer is constructed for addition only and is used in the present instance to accumulate total net balances. The upper rear or #3 totalizer is an add-subtract totalizer and in the present arrangement is used in conjunction with the #1 totalizer to effect repeat recordings of the entries, as will be explained more fully later.

The totalizers are engageable with the amount actuator racks in adding and subtracting operations for actuation thereby, to enter in said totalizers the amount set up on the amount keys at the same time that said actuators are positioning the corresponding printing sectors. In total and sub-total recording operations, the selected totalizer controls the positioning of the actuator racks and the corresponding printing sectors to effect a recording of the amount contained in said selected totalizer.

The add and subtract functions of the machine are controlled by means of control blocks mounted on the traveling carriage in relation to columnar positions thereof, said control blocks having add control tappets thereon, which, in cooperation with corresponding add hanging bar levers, select the totalizers for adding operations. Likewise, the control blocks have subtract control tappets thereon, which, in cooperation with corresponding subtract hanging bar levers for the two add-subtract totalizers, select said totalizers for subtract operations. Furthermore, the add-subtract totalizers may be selected for subtract operations by means of corresponding subtract control keys.

In the present machine, control keys are provided for selecting the #1 or balance totalizer and the #2 adding totalizer for sub-total or reading and total or resetting operations. In sub-total operations, the Sub-Total control keys are used in conjunction with the corresponding Total key to cause the amount read from the selected totalizer to be re-entered in said totalizer. Mechanism under control of the traveling carriage is provided for initiating automatic operation of the machine as said traveling carriage tabulates from one columnar position to the next.

The present machine is arranged to print three identical records of each transaction upon each of three similar portions of a record slip, said portions being separable to provide three identical and original records of each transaction or, if desired, of all the transactions in connection with an extended or prolonged business period, such as a day, a week, or a month. Each complete transaction includes three operations or cycles of the machine—a first or initial operation, which is initiated by depression of the main starting bar or the proper motorized control key in the usual manner, and two automatic repeat operations following the initial operation without interruption, said automatic operations being initiated by the traveling carriage as it tabulates from one columnar position to the next.

The usual posting of an account includes debit transactions, in which debit items, such as purchases, are added to the account; credit transactions, in which credit items, such as payments on account, are subtracted from the account; and, finally, a balance transaction, in which a new balance is ascertained.

Each of the above transactions involves three machine operations, and, in the case of debit and credit transactions, the data is set up on the keyboard and the first machine operation is initiated in debit transactions by use of the regular starting bar and in credit transactions by use of the proper Subtract key in conjunction with the starting bar. The initial operation of a balance transaction is initiated by use of the motorized Balance key.

In the above transactions, the amount of the item is entered additively in the #3 totalizer in the first operation. In the second operation, the #3 totalizer is automatically sub-totalized to effect a repeat print of the item, and in the third operation the #3 totalizer is automatically totalized or reset to effect another repeat print of the item.

It is therefore clear that the second and third operations of debit, credit, and balance transactions are similar in every respect.

In posting an account, if the total of the credit items amounts to more than the total of the debit items, a credit balance or overdraft is created in the balance totalizer, and this is brought to the attention of the operator by the automatic locking of the Balance key.

The usual procedure in this case is to perform a credit balance transaction, and this varies from the other transactions in that it is necessary to perform a preliminary conditioning operation. In the preliminary operation, the operator moves the traveling carriage "off-stop" one step in a return direction from the first columnar position, depresses the #3 Subtract key to select the #3 totalizer for subtract and to unlock the Balance key, and then initiates machine operation by depressing said Balance key. In the ensuing preliminary operation, the complementary amount of the credit balance is cleared from the balance totalizer and simultaneously subtracted from the previously cleared #3 totalizer, to obtain the true amount of said credit balance. The printing mechanism is rendered inoperative in the preliminary operation, so that no record of this operation will be made on the record material.

The carriage is then returned to the first columnar position, and the first operation in a credit balance transaction is initiated by depression of the motorized Credit Balance key. In this operation, the #3 totalizer is sub-totalized to print the true amount of the credit balance in the first portion of the record slip.

In the two ensuing automatic operations, the #3 totalizer is sub-totalized and totalized, respectively, the same as in other transactions, to effect a repeat print of the true amount of the credit balance on the second and third portions of the record slip.

Depression of the Balance key selects the #2 totalizer for an add operation to accumulate a total of the net balances therein.

A sub-balance of the amount in the balance totalizer may be obtained, when desired, by depression of the Sub-Balance key. Likewise, a total of the amount in the #2 totalizer may be obtained by depression of the #2 Total key, or, if desired, a sub-total of the amount in the #2 totalizer may be obtained by depression of the Sub-Total key in conjunction with the #2 Total key. As in the other types of transactions, the sub-balance and the #2 total are recorded on each of the three similar portions of the record slip, but, due to the construction characteristics of the machine, a sub-total of the #2 totalizer is printed on the first portion only of the record slip.

The control keys, including the Non-Add, Subtract, Total, Sub-Total, Balance, Sub-Balance, and Credit Balance keys, position a symbol-printing sector to record a character identifying the type of operation being performed. The control keys are invariably released near the end of the initial or first of each series of operations; therefore it was necessary to provide mechanism to retain the symbol-printing sector in position during the two repeat operations following an initial operation, to effect repeat prints of said identifying characters in said operations. This retaining mechanism is controlled by the #3 totalizer and remains effective until said totalizer is disengaged from the actuators near the end of the third or final operation in a series of operations.

It is desirable that credit and credit balance entries and the data in connection therewith be printed on each of the three portions of the record material in a distinctive color, such as red, to distinguish them from other entries, which are printed in black. The printing of the credit and credit balance entries in red in the initial operation of each transaction is effected in the customary manner under the control of the subtract and credit balance selecting and conditioning mechanisms, which cause the two-color inking ribbon to be moved to red printing position prior to functioning of the printing mechanism. At the end of each machine operation, the ribbon is restored to black printing position, and the present machine is provided with mechanism which functions under control of the #3 totalizer to return the ribbon to red printing position in the two automatic repeat operations following an initial operation, so that the second and third credit and/or credit balance entries will be printed in red to agree with the first recording of said items.

The mechanism for controlling the #3 totalizer to effect identical recordings of the data relating to each transaction upon each of three similar portions of the record slip, and other mechanism pertinent to the instant invention, will now be described in detail.

DETAILED DESCRIPTION

Framework and traveling carriage

The framework of the machine embodying the present invention comprises a right main frame 20 (Fig. 5) and a left main frame 21 (Figs. 1 and 2), said frames being secured in properly spaced parallel relationship to each other by means of a machine base (not shown) and various cross frames, bars, and rods. Secured to the rearward ends of the main frames 20 and 21 is a totalizer framework 22, which supports the #1 and #2 totalizers, and secured to the totalizer framework 22 by means of similar right- and left-hand brackets 23 (only the left-hand bracket shown here) is a similar totalizer framework 24, which normally supports the #3 and #4 totalizers; however, in the present adaptation the #4 totalizer has been omitted.

The framework of the machine and the mechanism supported thereby are enclosed in a suitable case or cabinet 25 (Fig. 1), which in turn supports properly spaced horizontal rails 26 and 27 for shiftably mounting a traveling carriage 28. The forward rail 26 has cut therein a horizontal channel to receive rollers mounted on the forward portion of the traveling carriage framework 28, while the rearward rail 27 has an angular raceway cut in its top surface to receive ball bearings, which coact with a similar raceway cut in a companion rail 30, secured to the rear portion of the traveling carriage framework 28. The traveling carriage 28 is retained in proper relationship with the rails 26, 27, and 30 by means of a downward shoulder formed on the rail 27 (Fig. 1) in cooperation with studs 31 (only one shown here) secured in an angle bar 32, in turn secured to a finished surface on the lower portion of the traveling carriage frame 28. Journaled in the framework 28 of the traveling carriage is a platen roll 33 for presenting record material, such as the statement slip shown in Fig. 10, to a plurality of printing sectors 34 (Fig. 1), which, in cooperation with a conventional type of two-colored inking ribbon (not shown), prints a record of each transaction upon said record material.

The traveling carriage 28 is yieldingly urged toward the left or in a tabulating direction by means of the usual type of draw band (not shown) in cooperation with a spring-actuated reel or drum (not shown). Power-operated means, which functions automatically when the traveling carriage reaches the terminus of its movement in a tabulating direction, is provided for returning the traveling carriage to starting position, or to other intermediate positions, if desired.

Removably mounted on the forward portion of the traveling carriage frame 28 (Fig. 1) is a stop bar 35, which adjustably supports a plurality of control blocks 36 located on the bar 35 according to the columnar spacing of the type of record material used in connection with a particular business system. In changing from one form of record material to another, the bar 35 and all the control blocks 36 located thereon may be removed as a unit from the machine, and a similar bar, with the required number of control blocks 36 properly spaced thereon, may be readily substituted therefor to properly control the columnar spacing of said record material.

The control blocks 36 (Fig. 1) are provided with stopping lugs which, in cooperation with the usual tabulating stop bars (not shown), control the columnar positioning of the traveling carriage both in a tabulating direction and in a return direction. Likewise the control blocks 36 are provided with properly spaced control tappets, which, in cooperation with corresponding hanging bar levers, control the adding functions of the #1 and #3 totalizers and the subtracting function of said #1 totalizer, and in the present adaptation there is a specially constructed control block for initiating automatic operation of the machine, as will be explained presently.

Machine operating mechanism

The machine is driven or operated by a conventional type of start-stop electric motor (not shown), which is operatively connected to the main shaft of the machine by a clutch mechanism, and said motor is energized and the clutch mechanism rendered effective in ordinary operations by means of a main release or starting bar 37 (Fig. 5) or by means of an auxiliary or vertical feed starting bar 38. The starting bar 37 has two downwardly extending arms, which pass through clearance slots in a keyboard top plate 39, secured to the main frames 20 and 21, and the stem of the vertical feed bar 38 likewise extends through a clearance opening in said top plate 39. The lower end of the starting bar 37 has two alined slots, which coact with rollers mounted on studs 40 and 41, secured in the right frame 20, to depressibly mount said starting bar.

The rear arm of the starting bar 37 carries a stud 42, which overlies and coacts with a finger 43 of a yoke 44 free on a stud 45 secured in the right frame 20. A spring 46, tensioned between a downwardly-extending finger of the yoke 44 and the stud 40, urges said yoke and the finger 43 counter-clockwise, as viewed in Fig. 5, to yieldingly maintain the starting bar 37 in its upward or undepressed position, as shown here. The yoke 44 has a forwardly-extending arm to which is pivotally connected a lifter 47, having graduated steps 48 and 49, which coact with a bent-over ear 50 on a latch 51 free on a stud 52 secured in the right frame 20.

A spring 53 (Figs. 5 and 6), tensioned between the latch 51 and the lifter 47, urges said parts clockwise to normally and yieldingly maintain said lifter in coacting relationship with the ear 50 and to normally maintain the latch 51 in yielding engagement with a bent-over ear 54 on a lever 55, free on a hub 56 of a lifter control plate 57, said hub being rotatably supported by a shaft 58 in turn journaled in the machine framework. A spring 59, tensioned between the lever 55 and the plate 57, urges said parts toward each other to normally maintain opposed surfaces of an extension of said plate and of an extension 60 of said lever in yielding engagement with corresponding portrusions of a stud 61 extending through and secured in a downward extension of a bell crank 62 free on the stud 40.

Depression of the starting bar 37 (Figs. 5 and 6) causes the stud 42 to rock the yoke 44 clockwise to raise the lifter 47, causing the step 48 thereon, in cooperation with the ear 50, to rock the latch 51 counter-clockwise, against the action of the spring 53, to disengage the tooth of said latch from the ear 54 to release the lever 55. A link 65 pivotally connects the lever 55 to a crank 63 free on a main shaft 64 journaled in the machine framework, whereupon release of the lever 55 permits a spring 84 to rock the crank 63 and said lever clockwise. Clockwise movement of the lever 55 causes the extension 60, in cooperation with the stud 61, to rock the bell crank 62 counter-clockwise. Counter-clockwise movement of the bell crank 62 causes a stud 66 carried thereby, in cooperation with an upward extension of three-armed lever 67 free on a stud 68 secured in the right frame 20, to rock said lever clockwise. Clockwise movement of the lever 67 causes a stud 69 in a downward extension thereof to be disengaged from a shoulder 70 on a clutch release arm 71 free on a stud 72 in the frame 20. This releases the arm 71 to the action of yieldable means (not shown) which rocks said arm counter-clockwise, causing said arm, through a pitman 73, one end of which is pivotally connected to said arm and the other end of which coacts with a clutch control lever (not shown), to engage the clutch mechanism and simultaneously actuate a switch mechanism (not shown) which energizes the electric operating motor (not shown) in the usual and well-known manner.

The operating motor is operatively connected by a connecting rod 74 (Fig. 5) to an arm 75 secured on the main shaft 64, and operation of said motor, through said connecting rod 74 and the arm 75, rocks the shaft 64 first counter-clockwise and then back to normal position through an angle of approximately 60 degrees, to effect a machine operation. The arm 75 carries a roller 76, which coacts with a slot 77 in an arm 78 secured to the right-hand end of a leading frame shaft 79 journaled in the main frames 20 and 21. Oscillation of the arm 75 first counter-clockwise and then back to normal position (Fig. 5), as explained above, causes the roller 76, in cooperation with the slot 77, to rock the arm 78 and the shaft 79 first counter-clockwise and then back to normal position. as observed in Fig. 5.

If a more complete description of the clutch mechanism and the operating motor is desired, reference may be had to Fig. 3, and the description in connection therewith, in United States Patent No. 2,332,755, issued October 26, 1943, to William H. Robertson et al.

Near the end of initial counter-clockwise movement of the main shaft 64 (Figs. 5 and 6), a stud 80 in a crank 81, secured on said shaft, engages a finger 82 on the crank 63 and restores said crank and the lever 55 counter-clockwise against the action of the spring 84 to move the ear 54 beyond the tooth of the latch 51, to permit said latch, under influence of the spring 53, to reengage said ear to retain said parts in restored positions. Near the end of clockwise return movement of the shaft 64, a cam on the clutch mechanism (not shown) restores the pitman 73 and the arm 71 rearwardly and clockwise, respectively (Fig. 5), to move the shoulder 70 beyond the stud 69, whereupon a spring 83, tensioned between the lever 55 and the bell crank 62, restores the lever 67 counter-clockwise to move the stud 69 into the path of said shoulder 70 to retain the arm 71 and connected parts in restored positions.

Depression of the vertical feed motor bar 38 (Fig. 5) causes said bar to engage a rearward extension of the main motor bar 37 and to simultaneously depress said main motor bar to initiate machine operation in exactly the same manner as explained above.

*Non-repeat mechanism*

Mechanism is provided for preventing a repeat operation of the machine in case either of the starting bars 37 or 38 is retained depressed at the end of machine operation. The lifter control plate 57 (Fig. 5) has a bent-over portion 86, which surrounds a depending tail 87 on the lifter 47, and, inasmuch as said plate 57 is yieldingly connected to the lever 55 by the spring 59, said parts move in unison when said lever 55 is released to the action of the spring 84 upon depression of the motor bar 37, as explained above. Clockwise initial movement of the plate 57 causes the bent-over portion 86, in cooperation with the tail 87, to shift the lifter 47 rearwardly or counter-clockwise, after the latch 51 has been disengaged from the ear 54, to move the step 48 of said lifter out of engagement with the ear 50 on said latch 51. This permits the spring 53 to immediately restore said latch 51 clockwise until the ear 50 engages the shoulder 49 to move the tooth of said latch into the path of the ear 54 on the lever 55, so that, regardless of whether or not the motor bar 37 or 38 is retained depressed, the latch 51 will be effective to engage the ear 54 and retain the lever 55 in restored position to prevent a repeat operation of the machine. When the pressure is released on the motor bar 37 or 38, the spring 46 (Fig. 5) restores the yoke 44 counter-clockwise and simultaneously restores the motor bar 37 or 38 upwardly and shifts the lifter 47 downwardly to move the step 49 out of engagement with the ear 50, and to move the step 48 into coacting relationship with said ear, in preparation for a subsequent releasing movement of said parts.

*Automatic machine release by traveling carriage*

Mechanism is provided whereby the traveling carriage, while moving from one columnar position to another, initiates an automatic machine operation, thus providing means for speeding up machine operation in business systems requiring a series of operations for each transaction.

In addition to the regular control blocks 36 (Fig. 1) mounted on the bar 35, the machine is provided with a series of machine release stops 88 (Figs. 5 and 7) adjustably mounted upon the bar 35 in relation to predetermined columnar positions where it is desired to have the machine function automatically. The control block 88 supports a flexible tappet 89, which coacts with an upwardly-extending finger 90 of a lever 91 rotatably supported on a stud 92 secured in a cross frame 367. The lever 91 is pivotally connected by a link 93 to a lever 94 (Fig. 5) free on a stud 95 secured in the right frame 20. Shiftably mounted on the lever 94 is a finger 96 having elongated slots which engage the stud 95 and a stud 97 secured in a forward extension of said lever 94. A spring 85 urges the lever 94 clockwise into yielding engagement with a stop disk 121 free on a stationary stud fast in the frame 20, to normally maintain the finger 90 in the path of the tappet 89. The forward end of the finger 96 overlies a stud 98 (Figs. 5 and 6) in a lever 99 free on the stud 45 and having pivotally connected to its forward end a lifter 100, similar in every respect to the lifter 47 (Fig. 5). The lifter 100 has two shoulders, similar to the shoulders 48 and 49, which are normally maintained in coacting relationship with the ear 50 on the latch 51 by a spring 101 tensioned between said latch and said lifter 100.

Tabulating movement of the traveling carriage toward the left, as viewed in Fig. 7, causes a camming surface on the tappet 89, in cooperation with the finger 90, to rock the lever 91 counter-clockwise to lift the link 93 to in turn rock the lever 94 also counter-clockwise (Fig. 5). The lever 94 carries the finger 96 counter-clockwise in unison therewith, causing the forward extension of said finger, in cooperation with the stud 98 (Figs. 5 and 6), to rock the lever 99 clockwise to raise the lifter 100. Raising the lifter 100 causes the right-hand shoulder thereon, in cooperation with the ear 50, to rock the latch 51 out of engagement with the ear 54 to initiate operation of the machine in exactly the same manner as explained in connection with the starting bars 37 and 38 (Fig. 5). The lifter 100 has a downwardly-extending tail 102, which coacts with the bent-over portion 86 on the plate 57 in exactly the same manner as explained for the lifter 47 to prevent unintentional repeat operations of the machine, in case either of the starting bars 37 or 38 is retained depressed at the end of machine operation.

A finger piece 141 of the finger 96 (Fig. 5) extends upwardly through an opening in the keyboard plate 39 and provides means whereby said finger 96 may be shifted rearwardly from the position shown here, to move the forward end of said finger out of the path of the stud 98 to disable the automatic machine release mechanism whenever required. When the traveling carriage is moving in a return direction, or to the right, as viewed in Fig. 7, the flexible tappet 89 by-passes the finger 90 without rocking the lever 91, to prevent automatic operation of the machine under such circumstances. As previously explained, as many of the control blocks 88 as required may be located upon the bar 35 in relation to predetermined columnar positions of the traveling carriage, so that tabulating movement of the traveling carriage to said predetermined columnar positions will initiate automatic operation of the machine.

*Machine release by control keys*

In addition to the starting bars 37 and 38, and the automatic means controlled by the traveling carriage for initiating operation of the machine, such operation may also be initiated by certain of the control keys located on the extreme left-hand side of the keyboard and often referred to as "motorized keys."

The control keys include a Release key 103 (Fig. 2), a Sub-Balance key 104, a Balance key 105, a Credit Balance key 106, a #2 Total key 107, a #3 Subtract key 108, a #1 Subtract key 109, a Sub-Total key 110, and a Non-Add key 111. The control keys are depressibly mounted on the left side frame 21. With the exception of the key 108, the reduced upper ends of all of the control keys extend through corresponding slots in a top plate 112 secured to the left frame 21, and the lower ends of said keys extend through corresponding slots in an angle bar 113 secured to said left frame 21 to depressibly mount said keys. Each of the control keys, except 108, has a corresponding compressible spring 114 enclosing the lower end of its stem, which springs are tensioned to urge said keys upwardly to normally maintain them in an undepressed position, as shown here.

The #3 Subtract key 108 (Figs. 2 and 8) is depressibly mounted on a plate 115 secured to the left frame 21 by means of a slot in its upper end, in cooperation with a stud 116 secured in said plate, and by means of a stud 117, secured in the lower end of said key 108, in cooperation with a corresponding slot in said plate 115. A spring 118, tensioned between the stud 117 and a latch 119 for the key 108, urges said key upwardly to normally maintain it in undepressed position, as shown here. The latch 119 is pivoted on a stud 120 in the plate 115.

Depression of the Balance key 105 (Fig. 2) moves a notch 122, in its rearward edge, opposite a bent-over ear on the upper end of a balance key latch 123, pivotally supported on a screw stud 124 in the frame 21. This releases the latch 123 to the action of a spring 125, which immediately urges said latch clockwise, causing the bent-over ear on its upper end, in cooperation with a projection 126 on a bar 127, to shift said bar forwardly. The bar 127 is shiftably mounted by means of a link 128, pivotally connected between its rear end and a stud secured in the frame 21, and by means of a slot in its forward end, in cooperation with a stud 129 in an arm (not shown), said arm in turn being pivotally connected to the frame 21.

Forward movement of the bar 127 (Fig. 2) causes a stud 130 in its forward end, in cooperation with the slotted upper end of a lever 131 free on a stud 132 in the frame 21, to rock said lever clockwise. Clockwise movement of the lever 131, through a slot in its lower end coacting with a stud 133 in a left arm 134 of a yoke 135 free on a shaft 136 journaled in the frames 20 and 21, rocks said yoke counter-clockwise, as viewed in Fig. 2, and clockwise, as viewed in Figs. 5 and 6. Clockwise movement of the yoke 135 (Figs. 5 and 6), through a stud 137 in a right arm 138 thereof in cooperation with a slot in the lower end of a lever 139 free on the stud 52, rocks said lever counter-clockwise. Counter-clockwise movement of the lever 139 causes a rearward extension thereof, in cooperation with a stud 140 in the forward end of the lever 99, to rock said lever clockwise to raise the lifter 100 to disengage the latch 51 from the ear 54 to initiate machine operation, when the Balance key 105 (Fig. 2) is depressed.

Depression of the Credit Balance key 106 or the #2 Total key 107 causes the bar 127 to be shifted forwardly, in exactly the same manner as explained in connection with the Balance key 105, to initiate operation of the machine. Depression of the Sub-Balance key 104, through the usual connections, simultaneously depresses the Balance key 105 to initiate operation of the machine in the manner explained above.

*Locking of release mechanism*

Mechanism under control of the traveling carriage is provided for locking the machine releasing mechanism against operation when the traveling carriage is "off-stop" or out of columnar position. This is to prevent maloperation of the machine, which could easily occur when the traveling carriage is out of columnar position, inasmuch as many of the important functions of the machine are controlled by said carriage when it is located in columnar positions.

Directing attention to Figs. 1, 5, and 6, the control blocks 36, which are located in relation to predetermined columnar positions, have a control tappet 364, which coacts with an upward extension of a hanging bar lever 365 free on a screw stud 366 secured in the cross frame 367. A left-hand extension of the lever 365 is connected by a wire link 368 to a crank 369 secured on a shaft 370 journaled in the machine framework. Also secured on the shaft 370 is a finger 371, the forward tip of which coacts with a stud 372 in a rearward extension of a release lock lever 373 free on the stud 95. A torsion spring (not shown) urges the lever 373 counter-clockwise to normally maintain a roller 374, carried thereby, above and in the path of a square stud 375 carried by a release control arm 376 free on the stud 40. A spring 377 (Figs. 5 and 6) urges the arm 376 clockwise to normally maintain an offset portion of the lower edge thereof in yielding engagement with the upper edge of a rearward extension of the bell crank 62.

When the traveling carriage 28 is in columnar position as shown in Fig. 5, the tappet 364 thereon, in cooperation with the lever 365, lifts the link 368 to rock the crank 369, the shaft 370, and the finger 371 counter-clockwise. Counter-clockwise movement of the finger 371 rocks the lock lever 373 clockwise to move the roller 374 sufficiently out of the path of the stud 375, so that, when the lever 55 (Fig. 6) is released to the action of the spring 84 by depression of the starting bars 37 or 38 or any of the motorized control keys, the bell crank 62 and the arm 376 will be free to move counter-clockwise to initiate operation of the machine, as explained above. Releasing movement counter-clockwise of the arm 376 causes the stud 375, coacting with the roller 374 (Fig. 5), to complete the rocking of the lock lever 373 to ineffective position without hindering the counter-clockwise releasing movement of said arm 376.

When the traveling carriage 28 is out of columnar position, the tappet 364 is moved out of coacting relationship with the upward extension of the hanging bar lever 365, to release the lock lever 373 to the action of its torsion spring, which immediately rocks said arm counter-clockwise to move the roller 374 directly opposite the square stud 375 to block counter-clockwise releasing movement of the arm 376 and the bell crank 62, to prevent operation of the machine when the traveling carriage is "off-stop" or out of columnar position.

The release tappets 89 (Figs. 5 and 7) are located between columnar positions of the carriage and actuate the lever 91 and connected mechanism, to release the lever 55 while the traveling carriage 28 is moving from one columnar position to the next. This releasing of the lever 55 (Fig. 6) moves the ear 54 beyond the tooth of the latch 51, and consequently said latch does not re-engage said ear when it is released by movement of the tappet 89 beyond the finger 90 of the lever 91. In this case, the lever 55 urges the bell crank 62 and the arm 376 counter-clockwise to force the stud 375 into yielding engagement with the roller 374, and this has a restraining effect upon clockwise unlocking movement of the locking lever 373. However, due to the anti-friction qualities of the roller 374, movement of the traveling carriage to the next columnar position permits the tappet 364 and associated mechanism to rock said lever 373 clockwise, regardless of the restraint thereon, to permit releasing movement of the arm 373 and the bell crank 62.

In certain adaptations of the machine, the locking lever 373 (Figs. 5 and 6) is provided with a square shoulder for coacting with the stud 375 instead of the roller 374, and in this case the friction between said shoulder and said stud is sufficient to forestall clockwise unlocking movement of said lever 373, when the traveling carriage moves into columnar position, as explained above. Under these circumstances, release of the latch 51, either manual or automatic, permits the ear 54 to move beneath the tooth of said latch to obstruct re-engagement of said tooth and said ear and thus produce a locked-up condition of the releasing mechanism. Manual means is provided for remedying this condition and includes a restoring lever 378 (Figs. 5 and 6) free on the stud 40 and connected by a stud 379 to the bell crank 62. The lower end of the lever 378 supports a finger piece 380, which extends through a suitable opening in the machine case 25.

To remedy the locked-up condition of the releasing mechanism, the operator grasps the finger piece 380 and restores the bell crank 62 clockwise, which movement, through the stud 61 (Figs. 5 and 6) simultaneously restores the lever 55 counter-clockwise to move the ear 54 into engaging relationship with the tooth of the latch 51 to permit said tooth to re-engage said ear to condition the releasing mechanism for operation. Likewise, clockwise movement of the bell crank 62 and the arm 376 withdraws the square stud 375 from contact with the shoulder on the locking lever 373 to free said lever, so that it may immediately move to ineffective position. After this, operation of the machine may be initiated in the usual manner by depression of the starting bars 37 or 38 or any of the motorized control keys.

*Amount keys and associated differential mechanism*

The present machine is provided with a plurality of denominational rows of amount keys 142 (Fig. 1) and their associated differential mechanisms, and, inasmuch as the mechanisms of the various rows are similar in every respect, it is believed that a description of the one row shown here and its associated differential mechanism will be sufficient.

The amount keys 142 in the representative row (Fig. 1) are depressibly mounted on a corresponding partition plate 143, which, together with similar partition plates for the other rows of amount keys, the top plate 39, and various cross bars and rods, forms an amount keyboard framework which is removable from the machine as a unit. The usual long coil spring (not shown) is provided for yieldingly retaining the amount keys 142 in their upward or undepressed positions, as shown here. Each of the amount keys 142 carries a square stud 144 in the lower end of its stem, and each of said studs, with the exception of the stud in the "9" key, coacts with a corresponding graduated step 145 on an amount actuator rack 146 shiftably supported by means of a rod 147, in cooperation with a recessed portion of the forward end of said rack 146, and by means of a bar 148 in cooperation with a horizontal slot formed in the rear end of said rack 146, said bar and said rod being supported by the machine frames 20 and 21. The actuator rack 146 (Fig. 1) has, near its center, a vertical slot which coacts with a stud 149 in a reducer arm segment 150 free on the leading frame shaft 79. A rearward arm 151 of the segment 150 is pivotally connected by a link 152 to the corresponding printing sector 34, rockable about a stud in the upper end of a corresponding arm 153 free on a printer shaft 154 journaled in the frames 20 and 21.

Each row of amount keys 142 has a detent plate 155 and a control plate 156 mounted for horizontal shifting movement between rollers rotatably supported by studs 157, secured in the partition plate 143. The detent and the plate are spaced in proper relationship to each other and in proper relationship to the partition plate 143 by suitable washers on the studs 157, said washers and the rollers being retained on said studs by suitable spring clips which engage corresponding annular grooves in the outer ends of said studs 157. The detent 155 has a tooth 158, formed in a corresponding opening therein, for each of the amount keys 142, each tooth arranged to cooperate with a stud 159 secured in the stem of the corresponding amount key 142. The control plate 156 has a camming surface 160, formed in a corresponding opening therein, for each of the amount keys 142, said camming surfaces arranged to cooperate with the corresponding studs 159. A spring 161, tensioned between the detent 155 and the control plate 156, urges said parts forwardly and rearwardly, respectively, to maintain the teeth 158 in coacting relationship with the studs 159 and to maintain the camming surfaces 160 in yielding engagement with said studs.

The forward end of the control plate 156 (Fig. 1) cooperates with a bent-over upward extension 162 of a zero stop latch 163 free on a shaft 164 supported by the keyboard framework. A spring 165, tensioned between the extension 162 and a stud in the control plate 156, normally maintains said parts in yielding engagement and normally maintains a tooth, formed on a rearward extension of said latch 163, in the path of a zero stop block 166 carried by the actuator rack 146.

Depression of any one of the amount keys 142 (Fig. 1) causes its stud 159, in cooperation with an angular camming surface formed on the upper edge of the corresponding tooth 158, to shift the detent 155 rearwardly against the action of the spring 161 until said stud 159 bypasses said tooth 158, whereupon the spring 161 returns said detent forwardly to latch the tooth over the stud to retain the key depressed. Depression of an amount key 142 also causes its stud 159, in cooperation with the corresponding camming surface 160, to shift the control plate 156 forwardly, against the action of the spring 161, to rock the zero latch 163 counter-clockwise to disengage its tooth from the block 166 to free the differential actuator for positioning movement. The control plate 156 is retained in its forward position, and consequently the latch 163 is retained ineffective, as long as the amount key is retained depressed by the detent 155.

Directing attention to Fig. 1, the rearward edge of the segment 150 is normally maintained in yielding engagement with the forward edge of a leading frame bail 168 by a spring 167 stretched between said segment and said bail. The bail 168 extends between a left arm 169 and a similar right arm (not shown), said arms in turn being secured on the leading frame shaft 79. Initial counter-clockwise movement of the shaft 79 (Fig. 1) and the bail 168, through the spring 167, yieldingly urges the segment 150 and the amount actuator rack 146 counter-clockwise and rearwardly, respectively, in unison therewith until such movement is terminated by the square stud 144 in the depressed amount key 142 being engaged by the corresponding step 145 on said actuator rack 146. This positions the actuator 146, the segment 150, and, through the link 152, the printing sector 34, in accordance with the value of the depressed amount key, after which the arm 153 and the sector 34 are released for printing movement to record the value of said depressed amount key upon the record material supported by the platen roll 33. After the actuator 146 and connected parts have been positioned by the depressed amount key 142, the leading frame bail 168 continues its counter-clockwise movement without interruption, stretching the spring 167. Return movement of the shaft 79 and the bail 168, near the end of machine operation, causes said bail to pick up the actuator 146 and restore it forwardly to home or zero position, as shown here.

By referring to Fig. 1, it will be noted that there is no corresponding step 145 on the actuator 146 for the square stud 144 in the lower end of the extreme right-hand or "9" amount key, and consequently this key functions only to release the zero stop latch 163, whereupon the actuator rack 146 is free to move full distance or nine steps rearwardly to ninth position, which position is determined by the forward wall of the undercut portion near its forward edge engaging the rod 147. In adding and subtracting operations, when no amount key 142 is depressed in the row being described, the zero stop latch 163 remains effective and, in cooperation with the block 166, retains the actuator rack 146 in zero position.

*Key releasing mechanism*

The present machine is provided with the usual key releasing mechanism, which functions near the end of adding and subtracting operations to shift the detent 155 (Fig. 1) rearwardly to disengage the tooth 158 from the stud 159 to release the depressed amount key 142 to the action of its spring, which immediately returns said key upwardly to undepressed position. This releases the control plate 156 to the action of the spring 161, which immediately restores said plate rearwardly to return the zero latch 163 to effective position. The key release mechanism functions at the beginning of total and sub-total recording operations to release any inadvertently depressed amount keys prior to such operation. The key release mechanism likewise shifts the control plate 156 forwardly at the same time the detent 155 is shifted rearwardly to rock the zero stop latch 163 counterclockwise to ineffective position in the beginning of total and sub-total recording operations, so that the actuator 146 will be free to be positioned under influence of the corresponding wheel of the selected totalizer.

The detent 155 (Fig. 1) and the control plate 156 have, respectively, similar upwardly-extending camming lugs 170 and 172, which cooperate with a stud 173 in a release arm 174 secured on the right-hand end of a key release shaft 175 journaled in the keyboard framework. Secured on the left-hand end of the shaft 175 (Fig. 4) is a depending arm 176 slotted to receive a stud 177 in an upward extension of a key release slide 178 mounted to shift horizontally by means of slots therein, in cooperation with studs secured in the left frame 21. The slide 178 pivotally supports a key release pawl 179, urged counter-clockwise by a torsion spring 207 into yielding engagement with a release roller 180, carried by a release disk 181, secured on the left-hand end of the main shaft 64.

Initial movement clockwise of the shaft 64 and the disk 181, as viewed in Fig. 4, causes the roller 180 first to by-pass a hook formed on the rear end of the pawl 179. Return counter-clockwise movement of the shaft 64 and the disk 181 causes the roller 180 to engage the hook of the pawl 179 to shift said pawl and the slide 178 rearwardly to rock the arm 176 and the shaft 175 clockwise, as viewed in Fig. 4, and counter-clockwise as viewed in Fig. 1. Counter-clockwise movement of the shaft 175 and the release arm 174 (Fig. 1) causes the stud 173, in cooperation with the camming lug 170, to shift the detent 155 rearwardly against the action of the spring 161, to disengage the tooth 158 from the stud 159 in the depressed amount key 142 to release said amount key to the action of its spring, which immediately restores said key upwardly to undepressed position.

Counter-clockwise movement of the arm 174 (Fig. 1) causes the stud 173, in cooperation with the camming lug 172 on the control plate 156, to shift said plate forwardly, against the action of the spring 161, to rock the zero latch 163 counterclockwise to ineffective position. This disengagement of the zero latch 163 in adding and subtracting operations is of no importance, but it is necessary in sub-total and total taking operations, as will be explained presently.

As the slide 178 (Fig. 4) reaches the terminus of its rearward releasing movement, an upward extension 182 of the pawl 179 engages a stationary stud 183 and rocks said pawl out of engagement with the roller 180 to permit said slide to be spring-returned forwardly to normal position. The key release slide 178 (Figs. 2 and 4) is operatively connected with the Release key 103, whereby depression of said key shifts said slide rearwardly to release the depressed amount key, in exactly the same manner as explained above.

In non-add operations, the amount keys are used to set up numerals to be printed upon the record material, and in such operations the key releasing mechanism functions exactly the same as explained in connection with adding and subtracting operations to release the depressed amount keys.

As previously mentioned, it is necessary for the amount key releasing mechanism to function at the beginning of sub-total and total taking operations in order to release any inadvertently depressed amount keys and to move the zero stop latches to ineffective positions. The sub-balance key 104 (Fig. 2) has a latch 184, similar to the latch 123 for the Balance key 105, said latch being pivoted on a screw stud 185 in the left frame 21. Pivotally connected to the lower end of the latch 184 is the forward end of a bar 186 (Figs. 2 and 4), said bar carrying a stud 187, which underlies a tail 188 on a release pawl 189 pivoted on a downward extension of the release slide 178, said pawl being urged clockwise by the torsion spring 207 tending to cause engagement of a notch 190 therein with a roller 191 on the lower end of a release lever 192 pivoted on a stud 193 in the frame 21. A spring 194 urges the lever 192 counter-clockwise to normally maintain a camming surface 195 thereon in yielding engagement with a roller 196 carried by the disk 181. A spring 197 (Fig. 4), which is strong enough to overcome the action of the torsion spring 207, urges the bar 186 clockwise or upwardly to normally maintain a stud 198 carried thereby in yielding engagement with a total control lever 199 (Fig. 2) for the No. 1 or balance totalizer.

While the bar 186 is maintained in its upward position, as shown in Fig. 4, the stud 187, in cooperation with the tail 188, maintains the notch 190 out of engagement with the roller 191, so that under normal conditions the pawl 189 will have no effect upon the releasing movement of the slide 178. As previously explained, depression of the Balance key 105 (Fig. 2) moves the notch 122 opposite the bent-over ear of the latch 123, whereupon the spring 125 rocks said latch clockwise, causing a stud 200 in its lower end, in cooperation with a camming surface on the lever 199, to rock said lever clockwise. Clockwise movement of the lever 199, through the stud 198, rocks the bar 186 counter-clockwise to withdraw the stud 187 from the tail 188 to permit the torsion spring 207 to rock the pawl 189 clockwise to engage the notch 190 with the roller 191.

Immediately after the notch 190 has been engaged with the roller 191, the shaft 64 and the disk 181 start their clockwise initial movement, as viewed in Fig. 4, which movement causes the roller 196, in cooperation with the camming surface 195, to rock the lever 192 also clockwise to in turn shift the pawl 189 and the slide 178 rearwardly to rock the shaft 175 and the arm 174 counter-clockwise, as viewed in Fig. 1, to shift the detents 155 rearwardly to release any depressed amount keys and to simultaneously shift the control plates 156 forwardly to rock the zero latches 163 out of engagement with the blocks 166, to free the actuators 146 for positioning movement under influence of the wheels of the selected totalizer, as will be explained presently.

*Amount key locking*

Near the beginning of machine operation, an amount key locking plate 201 (Fig. 1), which is located adjacent to and inwardly from the detent 155 and is mounted for horizontal shifting movement between the rollers carried by the studs 157 in exactly the same manner as said detent, is shifted rearwardly to move teeth 202, formed in openings therein, beneath the studs 159 of the undepressed amount keys 142 to lock said keys against depression during machine operation. The locking plate 201 has an upward extension 203, a rearward nose of which is normally maintained in yielding engagement with a finger 204 secured in a groove in a locking shaft 205, journaled in the keyboard framework, by a spring 206 tensioned between said extension 203 and said finger 204.

Mechanism, which functions in unison with the machine releasing mechanism, imparts clockwise movement to the shaft 205 (Fig. 1), causing the spring 206 to carry the locking plate 201 rearwardly in unison therewith to move the teeth 202 beneath the studs 159 of the undepressed amount keys 142 to lock said keys against depression during machine operation. Near the end of machine operation, the shaft 205 is restored counter-clockwise to return the locking plate 201 forwardly to normal or ineffective position, as shown here.

In sub-total and total operations, the locking plate 201 is shifted rearwardly to effective position prior to functioning of the amount key release mechanism to release any inadvertently depressed amount keys in the beginning of such operations. In such cases, the spring which restores the depressed amount keys to undepressed position is strong enough to overcome the action of the spring 206; consequently the studs 159 by-pass the corresponding teeth 202, which teeth immediately return to effective position beneath the studs 159 to obstruct depression of the amount keys.

*Totalizer mechanism*

As previously explained, the present machine is provided with three totalizers, said totalizers being in the usual arrangement of vertical pairs (Fig. 1) located at the rear of the machine. The upper front or No. 1 totalizer is an add-subtract totalizer, the lower front or No. 2 totalizer is an adding totalizer, and the upper rear or No. 3 totalizer is an add-subtract totalizer.

The actuator 146 (Fig. 1) for the denominational order being described has, on its rearward end, two sets of gear teeth, the upper set of which coact with a corresponding totalizer wheel 209 on the No. 1 totalizer line and the lower set of which cooperate with a corresponding wheel 210 on the No. 2 totalizer line. Secured to the rearward end of the actuator 146 is an extension rack 211, the rear end of which is bifurcated to embrace a supporting bar 212 secured in the totalizer framework 24. The extension rack 211 has, on its upper edge, a set of gear teeth which cooperate with a corresponding totalizer wheel 213 on the No. 3 totalizer line.

The No. 3 totalizer, the engaging mechanism, and the associated controlling mechanism will be explained in general as representative of all of the totalizers, as the mechanisms are similar and are not of primary importance in connection with the present invention.

The wheels 213 (Fig. 1) of the No. 3 totalizer are rotatably supported on a No. 3 totalizer shaft 214 supported in a rockable framework in turn supported by the totalizer framework 24. The shaft 214 has, on opposite ends thereof, rollers (not shown), which are engaged by corresponding slots in totalizer engaging cams (not shown) secured on a No. 3 totalizer engaging shaft 215 (Fig. 2) journaled in the framework 24. Secured on the left-hand end of the engaging shaft 215 is a crank 216 pivotally connected by a link 217 to the upper end of a flying lever 218 (see also Fig. 8) pivoted on a stud 219 carried by a totalizer engaging plate 220 secured on the main shaft 64.

Pivotally mounted on a stud in the upper end of the flying lever 218 is a totalizer engaging pawl 221 urged counter-clockwise by a torsion spring (not shown) into yielding engagement with a stop stud 222 secured in said lever 218. A rearward extension of the pawl 221 coacts with a stud 223 secured in the plate 220 to engage the No. 3 totalizer in adding time, as will be explained presently. An upwardly-extending finger 224 of the pawl 221 coacts with a stud 225 in a non-add control arm 226 free on a stud 227 secured in a sub-frame (not shown) in turn secured to the left frame 21. A downward extension of the arm 226 (Fig. 2) has a shoulder 228 normally engaged by a latch 229 free on a stud 230 in the sub-frame. The latch 229 is connected by a hanging bar 231 to a corresponding hanging bar lever (not shown), said hanging bar lever having an upturned portion which coacts with a corresponding tappet on the control blocks 36 (Fig. 1) located in relation to columnar positions of the traveling carriage in which it is desired to select the No. 3 totalizer for adding operations.

The stud 225 (Fig. 2) in the arm 226 is engaged by a slot in the upper end of a restoring pitman 232, the lower end of which is pivotally connected to a lever 233 free on a stud 234 secured in the frame 21. A downward extension of the lever 233 carries a stud 235, which underlies a bent-over ear on a lever (not shown) similar in outline to the lever 233 and free on the stud 234, said lever carrying a shoe (not shown) which cooperates with a camming surface 236 on an engaging plate 237 similar in outline to the engaging plate 220, said plate 237 being associated with the engaging mechanism for the No. 1 and No. 2 totalizers.

Clockwise initial movement of the engaging plates 220 and 237, as viewed in Fig. 2, moves the surface 236 on said plate 237 out of engagement with the shoe to release the lever 233, the pitman 232, and the arm 226 to the action of a spring 238, which immediately urges said arm 226 counter-clockwise to engage the shoulder 228 with the rear end of the latch 229 when said latch is in effective position, and in this case said latch would retain said arm 226 in effective position, as shown here. When the arm 226 is effective, the stud 225 remains in the path of the upward finger 224 and is engaged by said finger, upon continued clockwise movement of the plate 220, to rock the pawl 221 clockwise to move the rearward extension of said pawl out of the path of the stud 223, so that no engaging movement will be imparted to the shaft 215 and the No. 3 totalizer.

A non-add latch (not shown), similar to a corresponding non-add latch 239 (Fig. 2) for the No. 2 totalizer, is provided for the No. 3 totalizer and coacts with a bent-over ear 240 on the downward extension of the arm 226, when the Non-Add key 111 is depressed, to obstruct counter-clockwise movement of said arm 226 to cause the No. 3 totalizer to be non-added, as explained above, in connection with the latch 229.

When the traveling carriage 28 (Fig. 1) is in a columnar position in which it is desired to select the No. 3 totalizer for adding operation, in this case the first columnar position, the tappet on the control block, in cooperation with the No. 3 hanging bar lever and the No. 3 hanging bar 231 (Fig. 2), rocks the latch 229 counter-clockwise out of the path of the shoulder 228, to free the arm 226 for counter-clockwise movement under influence of the spring 238, when the lever 233 and the pitman 232 are released by initial movement of the engaging plates 220 and 237, as explained above. This counter-clockwise movement of the arm 226 moves the stud 225 out of coacting relationship with the finger 224, and therefore the rearward extension of the pawl 221 remains in the path of the stud 223. Near the end of initial movement of the plate 220, the stud 223 engages the pawl 221 to cause the flying lever 218 and the link 217 to move in unison with said plate 220, to in turn rock the crank 216 and the engaging shaft 215 (Fig. 2) counter-clockwise. Counter-clockwise movement of the shaft 215 causes the cams thereon, in cooperation with the rolllers on the No. 3 totalizer shaft 214 (Fig. 1), to rock said shaft, and the rockable framework supporting said No. 3 totalizer, downwardly to engage the wheel 213 with the corresponding teeth in the extension 211 of the actuator rack 146, after said rack has completed its initial rearward movement and has been positioned under influence of the depressed amount key 142, as explained earlier. Forward return movement of the actuator 146 and the extension 211 rotates the corresponding totalizer wheel 213 in an additive direction to add therein the value of the depressed amount key 142.

The usual construction of the totalizer engaging mechanism is such that a square stud (not shown), carried by the engaging plate 220, engages the flying lever 218 near the end of return counter-clockwise movement of said plate 220 (Fig. 2) and causes said flying lever and the link 217 to move in unison with said plate to rock the crank 216 and the shaft 215 clockwise back to normal position, to disengage the wheel 213 from the teeth in the extension 211, after said extension and the actuator 146 have completed their return forward movement. However, the square stud has been omitted from the control plate 220 in the present adapation, and consequently, once the No. 3 totalizer is engaged with the actuators in adding time, it remains thus until disengaged in a subsequent balance or total operation, as will be explained later. Near the end of counter-clockwise return movement of the plates 220 and 237 (Fig. 2), the surface 236 engages the shoe (not shown) to rock the lever 233 clockwise, which movement, through the pitman 232, restores the arm 226 also clockwise against the action of the spring 238 to non-add position, as shown here, in which position the shoulder 288 is slightly beyond the rear end of the latch 229, so that said latch may freely move into the path of said shoulder upon movement of the traveling carriage to another columnar position.

The No. 1 and No. 2 totalizers are provided with mechanism similar in every respect to that described for the No. 3 totalizer, for controlling adding and non-adding operations therein, and, inasmuch as this mechanism is well known in the art, further description is believed unnecessary. However, if a more detailed description is desired, reference may be had to the United States Patent No. 2,038,717, issued April 28, 1936, to Raymond A. Christian.

As previously explained, the record material used in the machine of this invention has three identical portions (Fig. 10) corresponding to the three columar positions of the traveling carriage, and in the first of the three related operations for each transaction, said transaction is handled in the ordinary way; that is, the amount is set up on the amount keys in the usual manner, and, if said amount is that of a debit item and is to be added, depression of the motor bar causes the corresponding add tappet on the first column control block and the corresponding hanging bar lever to control the #1 add latch to select the #1 totalizer for addition. If the amount is that of a credit item and is to be subtracted, the No. 1 subtract key 109 is depressed prior to depression of the motor bar, and, as a subtract operation supersedes an adding operation controlled by the traveling carriage, the No. 1 or balance totalizer will be engaged and disengaged in subtract timing. In either case, in the first operation, the No. 3 totalizer, which has previously been cleared, is selected for an adding operation through the corresponding add tappet, hanging bar lever, and latch 229 (Fig. 2), and, during the entering of the positive or negative amount in the balance totalizer, it is simultaneously entered additively in the No. 3 totalizer.

Forward movement of the link 217 (Fig. 2), to engage the No. 3 totalizer in adding time, causes a stud 243 carried thereby, in cooperation with a slot in the upper end of an arm 244 free on the stud 234, to rock said arm clockwise. The arm 244 carries a stud 245, which pivotally supports the rear end of a pitman 246, having, near its forward end, a slot which freely engages a collar on a stud 247 secured in the left frame 21. Clockwise movement of the arm 244 shifts the pitman 246 forwardly, causing a camming surface 248 on its forward end, in cooperation with the stud 198, to depress the bar 186 (Fig. 4) to render the pawl 189 effective in the succeeding operation. In the first operation, the pawl 179 (Fig. 4) functions as usual to release the depressed amount keys at the end of machine operation.

At the end of the first operation, the traveling carriage automatically tabulates to the second columnar position and, while moving to said second columnar position, initiates an automatic machine operation through the mechanism shown in Figs. 5 and 7 and explained earlier herein. In the second of the three related operations, the No. 1 and No. 2 totalizers are automatically non-added, and, inasmuch as the No. 3 totalizer remains in engagement at the end of the first operation, it is still in engagement during the second operation. As a result, the latch 189 (Fig. 4) remains effective and, in the beginning of the second machine operation, shifts the slide 178 rearwardly to release any inadvertently depressed amount keys and to simultaneously release the zero stop latches 163 (Fig. 1) so that the amount actuator racks 146 are free to move rearwardly upon initial movement of the leading frame 168.

Rearward movement of the actuator racks 146 (Fig. 1) in the second operation reversely rotates the wheels 213 of the No. 3 totalizer until said wheels are stopped in zero position by the teeth of the tripping cams thereon engaging the corresponding add transfer trip pawls, to position said actuator racks 146 in accordance with the amount on the No. 3 totalizer wheels, which, it will be remembered, is the amount previously set up on the amount keys in the first operation. Functioning of the printing mechanism causes a repeat printing of the exact amount of the first operation upon the second portion of the record material. The No. 3 totalizer remains in engagement with the amount actuators during their return movement, and consequently the amount is reentered therein, to provide what is in effect an automatic sub-total operation.

It is apparent that the No. 3 totalizer may be automatically sub-totalized as many times as desired in operations similar to the second operation, to obtain as many repeat prints of the transaction or entry as are necessary or desired.

At the end of the second operation, the traveling carriage tabulates automatically from the second columnar position to the third columnar position, and during this tabulation the machine is again released for an automatic third operation, in which the No. 3 totalizer is cleared and the amount therein printed in the third portion of the record material.

In the third and last operation of the series of three, the No. 1 and No. 2 totalizers are non-added, as in the second operation, and the No. 3 totalizer is selected and conditioned for a clearing or total-taking operation to clear the amount therefrom and repeat-print it on the third portion of the record material.

The control block 36 (Fig. 1) for the third column has a tappet which coacts with an upturned portion of a No. 3 total control hanging bar lever 249 (Fig. 8) free on the stud 366. The rear end of the hanging bar lever 249 engages a slot in the upper end of a hanging bar 250 pivotally connected at its lower end to one end of a lever 251 free on a stud 252 in the left frame 21. Pivotally connected to an upward extension of the lever 251 is a link 253 having, in its forward end, a stud which engages a slot 254 in an engaging control lever 255 rotatable on a stud 256 in the frame 21. A spring 257 forms a yieldable connection between the lever 255 and the stud in the forward end of the link 253, whereby the slot 254 permits independent movement of said link and connected parts in case corresponding movement of the lever 255 is obstructed for any reason. A spring 258, connected between the link 253 and a stationary stud (not shown), urges the levers 251 and 255 counter-clockwise to normally maintain them in ineffective positions, as shown here, which in turn, through the hanging bar 250, normally maintains the No. 3 hanging bar lever 249 in undepressed position.

Movement of the traveling carriage to third columnar position depresses the No. 3 hanging bar lever 249 (Fig. 8) to raise the hanging bar 250 to rock the levers 251 and 255 clockwise against the action of the spring 258. Clockwise movement of the lever 255 causes a stud 259 in its lower end, in cooperation with a camming surface 260 on a lever 261 free on the stud 247, to rock said lever also clockwise. The lever 261 carries a totalizer-disengaging pawl 262, urged counter-clockwise by a spring 263 to normally maintain a stud 264, carried thereby, in yielding engagement with a finished surface on the lower edge of said lever 261. Clockwise movement of the lever 261, in the third operation, moves the upper end of the pawl 262 into the path of the lower end of the flying lever 218.

Inasmuch as the wheels of the No. 3 totalizer are in engagement with the amount actuator racks 146 (Fig. 1) in the beginning of the third operation, initial rearward movement of said racks rotates said wheels in a reverse direction until said wheels are stopped in zero position, to position said actuator racks and the corresponding printing sectors in accordance with the amount standing on said No. 3 totalizer wheels. Subsequent functioning of the printing mechanism causes the amount to be repeat-printed upon the third portion of the record material. During clockwise initial movement of the main shaft 64 and the engaging plate 220 (Fig. 8), the lower end of the flying lever 218 by-passes the disengaging pawl 262, and, at the beginning of the counter-clockwise return movement of said shaft and said plate, and while the wheels of the No. 3 totalizer are in a zeroized condition, the lower end of the flying lever 218 engages the pawl 262 to cause said lever to move counter-clockwise with the plate 220 to shift the link 217 (Fig. 2) rearwardly. This rocks the shaft 215 clockwise to disengage the wheels of the No. 3 totalizer from the actuator racks 146 prior to forward return movement of said actuators, and consequently the No. 3 totalizer wheels remain in a zeroized or cleared condition at the end of the third operation, in preparation for the next series of operations. Other debit items in the same account are added in the No. 1 totalizer and repeat-printed on the three portions of the record material, the same as explained above, and credit items are handled in substantially the same manner, except that they are subtracted from the No. 1 totalizer in the first operation, as explained before.

After all of the debit and credit items have been entered in a particular account, the usual procedure is to arrive at a new balance by depression of the Balance key 105 (Fig. 2) to initiate a series of three operations, in the first of which the balance or No. 1 totalizer is cleared and the amount therein simultaneously entered additively in the No. 2 and No. 3 totalizers.

Depression of the Balance key 105 (Fig. 2) moves the notch 122 therein opposite the ear on the latch 123, whereupon the spring 125 rocks said latch clockwise to shift the bar 127 forwardly to initiate machine operation, as explained in connection with Figs. 2, 5, and 6. Clockwise movement of the latch 123 causes the stud 200, in cooperation with a camming surface on the total control lever 199, to rock said lever clockwise to cause the No. 1 or balance totalizer to be engaged and disengaged in total timing, in the usual and well-known manner. Depression of the Balance key 105 (Figs. 2 and 3) causes a stud 241 carried thereby, in cooperation with a slot in the forward end of a lever 242, pivoted on a stud 126 in the frame 21, to rock said lever clockwise. Clockwise movement of the lever 242 causes a rearward extension thereof, which underlies a stud 265 in a No. 2 hanging bar 266, to lift said hanging bar. The hanging bar 266 is pivotally connected to the forward end of a No. 2 add-control latch 267 free on a stud secured in the left frame 21. Consequently, lifting of said hanging bar rocks said latch counter-clockwise to move a rearward extension thereof out of the path of a shoulder on a No. 2 add-control arm 268, similar in every respect and functioning exactly like the add-control arm 266, (Fig. 2) for the No. 3 totalizer, explained earlier. This conditions the No. 2 totalizer for an adding operation, so that the amount cleared from the balance totalizer in the first operation will be transferred to the No. 2 totalizer, which is used in the present adaptation to accumulate a net total of the balances.

The Balance key 105 and other control keys control the positioning of a symbol-printing sector to print a character identifying the type of operation adjacent the amount. Ordinarily, release of the control key at the end of an operation permits the printing sector to be restored to a neutral position. In the present machine, it is desirable that the sector remain positioned, so that the character will be repeat-printed in the second and third operations of each series, and mechanism under control of the No. 3 totalizer has been provided for accomplishing this result.

Depression of the Balance key 105 causes the lower end of its stem (Fig. 2), in cooperation with a camming surface 269 on a slide 270 mounted to shift horizontally by means of slots therein, coacting with studs 271 secured in the frame 21, to shift said slide forwardly.

The slide 270 is pivotally connected by a link 272 (Figs. 2 and 9) to a crank 273 secured on a shaft 274 journaled in the frames 20 and 21. Also secured on the shaft 274 is an arm 275 connected by a link 276 to an arm 277 pivoted on a stationary stud 278. The arm 277 is pivotally connected by a link 279 to a symbol-printing sector 280 pivotally connected to an operating arm 281 similar to the arm 153 for the printing sector 34 (Fig. 1), said operating arm being free on the shaft 154.

Forward movement of the slide 270 (Figs. 2 and 9) and the link 272 causes said link to rock the crank 273, the shaft 274, and the arm 275 clockwise, which movement, through the link 276, the arm 277, and the link 279, positions the symbol-printing sector 280 in its second position, whereupon subsequent operation of the printing arm 281 carries said sector 280 into contact with the inking ribbon and the record material supported by the platen roll to record a symbol, in this case an asterisk, characteristic of a balance operation upon said record material.

At the end of the first of a series of three operations, the Balance key 105 is restored upwardly to normal position, and under normal conditions the slide 270 would be simultaneously restored rearwardly to normal position, as shown in Fig. 2; consequently the printing sector 280 would also be restored to normal or non-printing position, as shown in Fig. 9. In the present adaptation, it is desirable that the printing sector 280 remain positioned, so that the printing of the balance symbol will be repeated in the second and third operations, and this is effected by forward movement of the link 217 (Fig. 2) in the first operation, to engage the No. 3 totalizer with the actuators in adding time, as explained earlier herein.

Adjacent the arm 244 (Fig. 2) and free on the stud 234 is a symbol-retaining pawl 282, urged clockwise by a spring 283 into yielding engagement with a stud 284, carried by said arm 244. The pawl 282 has, on its downward end, retaining teeth which coact with similar teeth in the periphery of a segment 285 secured on the symbol shaft 274 (see also Fig. 9). After the symbol shaft 274 and the segment 285 have been positioned by depression of the Balance key 105 (Fig. 2), as explained above, initial forward movement of the link 217, to engage the No. 3 totalizer with the actuators in adding time in the first operation, rocks the arm 244 clockwise to withdraw the stud 284 from the pawl 282 to permit the spring 283 to engage the teeth of said pawl with the corresponding teeth in the segment 285 to yieldingly retain said segment, the shaft 274, and the symbol-printing sector in set position at the end of the first machine operation, and after the Balance key 105 has been released and restored upwardly. It will be recalled that the No. 3 totalizer remains in engagement during the second and third operations, and consequently the link 217 remains in its forward position, thus causing the printing sector 280 (Fig. 9) to remain positioned during the second and third operations to repeat-print the symbol in said second and third operations.

Rearward disengaging movement of the link 217 (Fig. 2) rocks the pawl 282 out of engagement with the teeth in the segment 285, to permit said segment, the symbol shaft 274, the slide 270, and connected parts, including the symbol-printing sector 280 (Fig. 9), to be immediately restored to normal or non-printing position, as shown here.

The Sub-Balance key 104 (Fig. 2), the Credit Balance key 106, the No. 2 Total key 107, the No. 1 Subtract key 109, and the Non-Add key 111 coact with the slide 270 in exactly the same manner as explained in connection with the Balance key 105 to position the symbol-printing sector 280 (Fig. 9) in accordance therewith, so that a symbol identifying the type of operation being performed will be recorded upon the record material. In each case, the pawl 282 (Fig. 2), in cooperation with the segment 285, retains said symbol sector in set position during the second and third operations, so that the identifying symbol will be repeat-printed upon the second and third portions of the record material.

*Credit balance operations*

A typical example of the use of the machine embodying the present invention is that of a wholesale merchant who sells merchandise to retail merchants, said merchandise being charged to the retail merchant's account and appearing as debit items on the record or statement slip. Likewise, credits in favor of the retail merchant, consisting of, for example, payments on account, credit for returned goods, etc., appear as credit items on said record slip. When the credits in favor of a retail merchant overbalance the debits against him, this creates a credit balance in his favor, and this results in an overdraft in the No. 1 totalizer, which is brought to the attention of the operator by the automatic locking of the No. 1 Balance key 105 against depression. The usual procedure in such a case is to perform a credit balance operation, in which the complementary or negative amount of the credit balance is transposed to a true or positive amount, and the true amount is recorded upon the record material in a distinctive color, as will now be explained.

The occurrence of an overdraft in the No. 1 or balance totalizer rocks an overdraft shaft (not shown) in the usual manner to shift a link 288 (Fig. 8), operatively connected thereto, rearwardly.

For a complete description of the overdraft shaft and how it is operated when the balance totalizer becomes overdrawn, reference may be had to Figs. 14 to 17 inclusive and the description in connection therewith in the United States Patent No. 2,243,806, issued May 27, 1941, to Laurence N. Lehman.

The forward end of the link 288 is pivotally connected to a companion link 289, the rear end of which is supported by a slot therein, which engages a stationary stud 290. The forward end of the link 289 (Fig. 8) is pivotally connected to a Balance key latch 291 free on the stud 124, said latch having on its downward end a bent-over ear 292, which coacts with a slot 293 in the stem of the No. 1 Balance key 105 (see also Fig. 2).

Rearward movement of the link 288, upon the occurrence of an overdraft, carries the link 289 rearwardly in unison therewith to rock the latch 291 counter-clockwise to engage the ear 292 with the slot 293, as shown in Fig. 8, to lock the Balance key 105 against depression when an overdraft occurs.

The operator becomes cognizant of the existence of an overdraft upon an attempt to depress the Balance key 105 to initiate a balance transaction, and, in the present adaptation, the recommended procedure upon discovery of an overdraft is to manually move the traveling carriage to the right to an "off-stop" position, which is determined by a left margin stop, and in which position the No. 3 totalizer is not automatically selected by the hanging bar mechanism for an adding operation, as is the case when the traveling carriage is in first columnar position. While maintaining the traveling carriage in its extreme right-hand or "off-stop" position, the operator depresses the No. 3 Subtract key 108 (Figs. 2 and 8), causing the stud 117 in its lower end, in cooperation with an angular slot 294 in a lever 295 free on the stud 120, to rock said lever clockwise, as viewed here. Clockwise movement of the lever 295 causes an upwardly-extending finger 296 thereof, in cooperation with a stud 297 in the link 289, to shift said link forwardly to rock the latch 291 clockwise to disengage the ear 292 from the slot 293 in the key 105, to unlock said key for depression.

Depression of the No. 3 Subtract key 108 (Fig. 8) moves a shoulder 298 thereon beyond an ear 299 on the latch 119 to release said latch to the action of the spring 118, which immediately rocks said latch clockwise. Clockwise movement of the latch 119 causes a depending finger 300 thereof, in cooperation with a stud 301 in the control lever 255, to rock said lever clockwise against the action of the springs 257 and 258. Clockwise movement of the lever 255 causes the stud 259, in cooperation with the camming surface 260, to rock the lever 261 also clockwise to move the pawl 262 into the path of the lower end of the flying lever 218. The lever 261 (Fig. 8) carries a downward extension 302, which coacts with the upper edge of a No. 3 engaging lever 303, free on the stud 247. The lever 303 is yieldingly connected by a spring 304 to a companion No. 3 engaging pawl 305 free on the stud 247, said spring normally maintaining a rearward extension of said lever 303 in yielding contact with a stud 306 carried by said pawl 305. Clockwise movement of the lever 261, through the extension 302, moves the lever 303 and the pawl 305 clockwise in unison therewith, to move said pawl into the path of the downward extension of the flying lever 218.

After depressing the No. 3 Subtract key 108 and while maintaining the traveling carriage in its extreme right-hand or "off-stop" position, the operator then depresses the No. 1 Balance key 105 to initiate a preliminary operation of the machine, to select and condition the No. 1 or balance totalizer for a total or clearing operation and to simultaneously select the No. 2 totalizer for an adding operation, by means of the mechanism shown in Fig. 3 and explained earlier herein. During the preliminary operation of the machine, initial clockwise movement of the main shaft 64 and the engaging plate 220 (Fig. 8) causes the lower end of the flying lever 218 to engage the pawl 305, to engage the previously cleared No. 3 totalizer with the amount actuators prior to initial movement of said actuators, which movement causes them to be positioned in accordance with the amount of the negative balance in the balance totalizer, and, as a result, said amount is entered subtractively in the No. 3 totalizer, to obtain a true negative balance therein. Prior to forward return movement of the amount actuators, the pawl 262, in cooperation with the lower end of the flying lever 218 (Fig. 8), disengages the No. 3 totalizer from the actuators, so that the true amount of the negative balance will remain in said No. 3 totalizer.

From the foregoing explanation it is obvious that in the preliminary or "off-stop" operation, which is necessary to obtain a true recording of a negative or credit balance, the balance totalizer is cleared and the negative amount therein is subtracted from the previously cleared No. 3 totalizer and added into the No. 2 totalizer, but, as the printing mechanism is disabled, the result of this preliminary operation is not recorded upon the record material.

At the end of the operation, the operator releases the traveling carriage, which then tabulates automatically to the first columnar position, and the first of the series of three related operations in a credit balance transaction, to record the amount of the credit balance in the three similar portions of the record material, may then be initiated by depression of the Credit Balance key 106 (Fig. 2).

The Credit Balance key 106 is a so-called motorized key and, upon being depressed, moves a notch in the upper edge of its stem into the path of a bent-over ear on a latch 307 rotatable on a stud 308 in the frame 21. This releases the latch 307 to the action of a spring 309, which immediately rocks said latch clockwise to cause said latch to shift the bar 127 forwardly, to initiate machine operation in the manner explained in connection with the Balance key 105. Clockwise movement of the latch 307 also causes a stud 310 (Figs. 2 and 8) carried thereby, in cooperation with a camming surface 311 on the lever 303, to rock said lever clockwise, which lever, by means of the spring 304, yieldingly carries the pawl 305 in unison therewith, to move said pawl into the path of the lower end of the flying lever 218. The pawl 305 engages a stud 312, secured in the lever 261, and carries said lever and the pawl 262 clockwise or upwardly in unison therewith.

Initial clockwise movement (Fig. 8) of the main shaft 64 and the engaging plate 220 causes the lower end of the flying lever 218 to coact with the pawl 305 to engage the No. 3 totalizer with the amount actuators at the beginning of the first operation and prior to initial rearward movement of said actuators. Forward engaging movement of the link 217 (Fig. 2) rocks the arm 244 clockwise to shift the pitman 246 forwardly, as explained before, to cause said pitman to rock the bar 186 (Fig. 4) counter-clockwise or downwardly to render the pawl 189 effective to shift the slide 178 rearwardly, at the beginning of machine operation, to release the zero stop latches so that the amount actuator racks 146 are free to move rearwardly and be positioned by the wheels of the No. 3 totalizer. Initial rearward movement of the amount actuator racks 146 reversely rotates the wheels of the No. 3 totalizer to zero position, to position said actuators and the corresponding printing sectors to the true amount of the credit balance, after which functioning of the impression mechanism causes said true amount to be recorded upon the first portion of the record material.

A stud 312 in the lever 261 (Fig. 8) also functions to maintain the proper relationship between the pawl 305 and the lower end of the flying lever 218. This is effected by a finished surface 313 on the upper edge of the lever 261 contacting a collar 314 on the shaft 64, and in this case the spring 304 permits the lever 303 to move independently of or relatively to said lever 261 in case it is overthrown by the latch 307.

Counter-clockwise return movement of the plate 220 would, under normal conditions, cause the lower end of the flying lever 218 to engage the pawl 262, and, with said pawl in its usual rigid condition, this would cause the No. 3 totalizer to be disengaged prior to return forward movement of the amount actuator racks 146; consequently the wheels of the No. 3 totalizer would remain in a zeroized condition, which is undesirable in this particular case. However, in the present construction, the spring 304, through the pawl 305 and the stud 312, forms a yieldable connection, so that the lower end of the flying lever 218 may by-pass the pawl 262, rocking said pawl, the lever 261, and the pawl 305 counter-clockwise against the action of said spring 304. This permits the wheels of the No. 3 totalizer to remain in engagement with the amount actuator racks 146 during their return movement, which movement restores said wheels to their original position, so that the true amount of the credit balance will remain on said wheels.

Near the end of the first operation, the traveling carriage tabulates automatically to the second columnar position and in so doing initiates an automatic machine operation which is similar in every respect to the second operations explained in connection with the debit and credit transactions to cause the No. 3 totalizer to be subtotalized, to repeat-print the true credit balance upon the second portion of the record material. At the end of the second operation, the traveling carriage tabulates automatically to the third columnar position, and in a third machine operation, which is likewise similar to the third operation explained in connection with the debit and credit transactions, the No. 3 totalizer is totalized or cleared and the true negative balance is again printed upon the third portion of the record material.

It is desirable that an identifying symbol of a credit balance transaction be printed adjacent the entries on the three portions of the record material, and this is effected in the usual manner by the lower end of the stem of the Credit Balance key 106 (Figs. 2 and 9), in cooperation with the corresponding camming surface on the slide 270, shifting said slide forwardly the proper extent to position the printing sector 280, so that the symbol (CR) for a credit balance operation is recorded adjacent the amount of the credit balance upon each of the three portions of the record material.

It will be recalled that, in the first of a series of debit-entering operations, the No. 1 or balance totalizer is selected by the traveling carriage for an adding operation, so that the amount of the item will be accumulated therein. However, in the first of a series of credit balance operations, it is desirable that the balance totalizer be non-added, so that the amount of the credit balance will not be entered therein.

This is effected by clockwise movement of the latch 307 (Fig. 2) upon depression of the Credit Balance key 106, causing said latch, in cooperation with a stud 315 secured in a link 316, to shift said link rearwardly. The forward end of the link 316 is slotted to embrace a stud 317 in the lower end of the sub-total latch 184, while the rear end of said link is pivotally connected to a No. 1 non-add latch 318 pivoted on a stationary stud in the frame 21. A spring 319, tensioned between a stud in the link 316 and the stud 317 (Fig. 2), urges the link forwardly to normally maintain the left-hand portion of the slot in yielding engagement with said stud 317, to provide a yieldable connection which permits said link 316 to shift rearwardly independently of the latch 184. Rearward movement of the link 316 rocks the non-add latch 318 clockwise to move a stop shoulder thereon into the path of an add control arm (not shown) for the No. 1 totalizer, which is similar in every respect to the add-control arm 226 (Fig. 2) for the No. 3 totalizer, to obstruct counter-clockwise movement of said add-control arm to non-add the No. 1 or balance totalizer in operations in which the Credit Balance key 106 is depressed.

*Ribbon control mechanism*

In the series of three operations comprised in a credit balance transaction, it is desirable that all of the recordings on the three portions of the record material be printed in red, so that credit balance items will be easily distinguished from other items. This result is obtained by depression of the Credit Balance key 106 (Fig. 2), which shifts the color control shaft from its normal or black printing position to its red printing position, and, inasmuch as the color control shaft is automatically restored from red to black printing position at the end of each machine operation, mechanism is provided which operates in conjunction with the No. 3 totalizer engaging mechanism to return the color control shaft from normal or black printing position to red printing position, as long as the No. 3 totalizer remains in engagement with the amount actuators, so that the three recordings of the credit balance will be in a distinctive color.

The latch 307 (Fig. 2) for the Credit Balance key 106 has secured to its upper end a plate 321 having a bent-over ear 322, which coacts with a downward extension of a pitman 323 shiftable mounted by means of slots in each end thereof, in cooperation, respectively, with a stud 324, secured in the frame 21, and a stud 325, secured in a bent-over portion of the top plate 112. The pitman 323 has pivotally connected to a rearward extension thereof the forward end of a link 326, the rearward end of which has a slot which engages a stud 327 in a downward extension of a crank 328 secured on the left-hand end of a color control shaft 329 journaled in a cross frame 330 in turn secured between the frames 20 and 21.

Depression of the Credit Balance key 106 (Fig. 2) permits clockwise movement of the latch 307 and the plate 321, under action of the spring 309, as explained previously, which movement causes the ear 322, in cooperation with the downward extension of the pitman 323, to shift said pitman and the link 326 forwardly. Forward shifting movement of the link 326 causes the slot in its rear end, in cooperation with the stud 327, to rock the crank 328 and the color control shaft 329 counter-clockwise from normal or black printing position to red printing position, in which position the red portion of a two-color inking ribbon 338 (Fig. 1) will be moved to printing position during machine operation.

Secured on the No. 3 engaging shaft 215 (Fig. 2) is an arm 331, which shiftably and rotatably supports a finger 332 by means of studs 333 and 335, carried thereby, in cooperation with, respectively, a slot in the rear end of said finger and a L-shaped slot 334 near the forward end of said finger. A spring 336, tensioned between the finger 332 and the arm 331, urges said finger forwardly and counter-clockwise (Fig. 2) to normally maintain said finger in the position shown here, in which the upward branch of the L-shaped slot 334 is in alinement with the stud 335.

Initial counter-clockwise engaging movement of the shaft 215 (Fig. 2) and the arm 331 in subtotal timing in the first of the series of three operations in a credit balance transaction carries a tip 337 of the finger 332 into the path of the stud 327 in the crank 328, and, inasmuch as the No. 3 engaging shaft 215 and the arm 331 remain in engaged position at the end of the first machine operation, obviously the tip 337 of the finger 332 remains in the path of the stud 327. As previously explained, the mechanism disclosed in Fig. 11, and the description in connection therewith in the Williams Patent No. 2,263,479, restores the color shaft from red printing position to black printing position near the end of each operation. This restoring movement clockwise of the color control shaft 329 (Fig. 2) and the crank 328 causes the stud 327, in cooperation with the tip 337, to shift the finger 332 rearwardly against the action of the spring 336, whereupon, immediately after disengagement of the restoring mechanism from the color shaft 329, the finger 332, under influence of the spring 336, returns the crank 328 and said shaft 329 counter-clockwise (Fig. 2) from black printing or normal position to red printing position, so that in the second operation of a credit balance transaction the repeat print of the credit balance will be in red.

Inasmuch as the No. 3 totalizer remains in engagement at the end of the second operation, the ribbon 338 is maintained in red printing position, and, as a result, the third entry of the credit balance upon the third portion of the record material is in red. In the third operation, the No. 3 totalizer is disengaged in total-taking time, and consequently the shaft 215 and the arm 331 are restored clockwise to disengaged position, as shown in Fig. 2, to move the finger 332 out of the path of the stud 327, so that the color control shaft 329, upon being restored, will remain in normal or black printing position at the end of said operation.

It will be recalled that subtract or credit items are also printed in red, and in such operations the finger 332 (Fig. 2) functions exactly the same as explained above to maintain the color control shaft 329 in red printing position, so that the three recordings of credit items will be in red.

In some cases, it is possible that the No. 3 engaging shaft 215, the arm 331, and the finger 332 may be rocked counter-clockwise prior to movement of the stud 327, the crank 328, and the color control shaft 329 from black to red printing position. When this occurs, the upward branch of the L-shaped slot 334 permits relative movement between the finger 332 and the arm 331 upon engagement of the tip 337 with the stud 327, and, when said stud and the color control shaft 329 are moved to red printing position, the spring 336 restores the tip 337 into the path of said stud 327, so that the color control shaft will be maintained in red printing position. Likewise, in operations where the color control shaft 329 (Fig. 2) remains in black printing position, the upward branch of the L-shaped slot 334 permits the finger 332 to pivot relatively to the arm 331 and against the action of the spring 336, so as not to interfere with engaging movement of said arm and the shaft 215.

STATEMENT OF OPERATION

While it is probable that a thorough knowledge of the operation of the machine embodying the present invention will have been obtained from a perusal of the preceding description, it is believed that a brief statement of operation, using the three-part slip shown in Fig. 10 as an example, may be helpful. Such a statement will now be given.

A typical example of the use of the machine embodying the present invention is that of a wholesale meat dealer who sells meats to a plurality of retail meat merchants throughout a certain locality. The prevailing method of rendering accounts by the majority of wholesale meat dealers is similar to the manner in which department stores, for example, handle open charge accounts, with the exception that, in the case of the wholesale meat dealer, bills or statements are rendered weekly instead of monthly, as is the usual practice with department stores.

The daily purchases of meat by each retail merchant are posted daily to his account in the form of debit items, and the credits, in the form of payments on accounts or returned merchandise, are posted as credit items to his account. At the end of a weekly period, the ledger card having the daily postings or entries is used to prepare the triple-portioned statement slip shown in Fig. 10, and the present invention is directed to a machine for use in preparing these triplicate statements.

The statement slip shown in Fig. 10 has three similar detachable or separable portions, including a customer's statement portion 340, a collector's duplicate statement portion 341, and an office or ledger portion 342. The three similar portions of the statement slip have at their head the name of the wholesaler, in this case "Any Meat Company," followed by the statement "In Account With" and then the name of the customer, in this case "A. Retailer," which is filled in on the line provided for the purpose.

In auditing A. Retailer's account, the operator properly places the three-part statement slip (Fig. 10) around the platen roll of the traveling carriage so that, when the traveling carriage is in its first columnar position, the extreme left-hand portion 340 of said slip is in alinement with the printing mechanism. Then, with A. Retailer's ledger card, containing the various transactions for the current weekly period, at hand, the operator sets up the date, May 10, on the date keys, the symbol (YB) for the class of merchandise purchased, on the symbol keys, and the amount of the purchase, $20.00, on the amount keys. Inasmuch as this is a debit transaction, all that is necessary to initiate the series of three machine operations is to depress the regular starting bar 37 (Fig. 5). In the first operation, the date, May 10, the symbol YB, and the amount of the purchase, $20.00, are printed in the first portion 340 of the statement slip, and the amount is simultaneously added in the No. 1 or balance totalizer and the No. 3 or working totalizer.

At the end of the first machine operation, the traveling carriage tabulates automatically to the second columnar position, in which the central portion 341 of the statement slip is in alinement with the printing mechanism, and, before the carriage arrives at said columnar position, the mechanism shown in Fig. 7 initiates an automatic operation of the machine, in which the No. 3 totalizer is sub-totaled and the amount of the first debit item, $20.00, is repeat-printed upon the central portion 341 of the statement slip. At the same time, the date, May 10, and the symbol (YB) are also recorded. The repeat print of the date in this case is effected by retaining the date keys depressed at all times, and the repeat print of the symbol YB is effected by providing a "star wheel" in the No. 3 totalizer for the row of symbol keys, which wheel is positioned in the first operation to a position corresponding to the depressed symbol key.

After the second or duplicate entry has been made upon the central portion 341, the traveling carriage tabulates automatically to the third columnar position, in which the right-hand portion 342 of the statement slip is in alinement with the printing mechanism, and while so tabulating initiates another automatic operation, in which the No. 3 totalizer is totalized or cleared and the amount of the debit item, $20.00, is repeat-printed on the third or triplicate portion 342. As before, the symbol YB and the date, May 10, are repeat-printed upon the triplicate portion 342, thus providing three identical printed records of the transaction for May 10.

The debit entry of $30.00 for May 11 is recorded upon the three portions of the statement slip in exactly the same manner as explained for the May 10 entry. In each case, after the third entry has been printed on the triplicate portion 342, the traveling carriage is automatically returned to the first columnar position, and simultaneously with its return, the platen roll is advanced or rotated to line-space the record material, in preparation for the next entry.

For the third entry in this particular account, the operator sets up the date, May 12, the proper symbol (CD) to identify this credit item, and the amount of the item, $40.00. Inasmuch as this is a credit transaction, the operator depresses the No. 1 Subtract key 109 (Fig. 2) to condition the balance totalizer for a subtract operation and then depresses the starting bar to initiate operation of the machine. Depression of the No. 1 Subtract key sets up a condition which causes the inking ribbon to be shifted to red printing position, so that the credit item will be printed in a distinctive color. Likewise, depression of the No. 1 Subtract key sets the operation symbol printing sector 260 (Fig. 9) to print a minus sign to the right of the amount, to identify this as a credit item.

In the first operation of a credit transaction, the date, May 12, the symbol CD, the amount of the credit ($40.00), and the minus sign are printed in red on the first portion of the statement slip, and the amount is simultaneously subtracted from the No. 1 totalizer and added into the No. 3 totalizer. At the end of the first operation, the traveling carriage tabulates automatically to the second columnar position, in which the central portion 341 of the record slip is in alinement with the printing mechanism, and in an automatic operation of the machine the identical data which was printed on the first portion 340 is repeat-printed on the duplicate portion 341, in the same manner as explained for debit items.

At the end of the second operation, the carriage tabulates automatically to the third columnar position, in which the right-hand portion 342 of the slip is in alinement with the printing mechanism, and in an automatic operation of the machine the data relating to the credit transaction is repeat-printed upon the third or triplicate portion of the statement slip. The debit item for May 13 is entered in exactly the same way as explained for the other debit items, and the credit item for May 14 is entered in exactly the same manner as explained for the previous credit item of May 12.

After all the debit and credit entries have been made for the weekly period, the operator depresses the No. 1 Balance key 105 to initiate the first of the three operations in a balance transaction, in which the No. 1 or balance totalizer is cleared and the total or balance therein ($50.00) is printed in the first portion 340 of the statement slip, and the identifying symbol (an asterisk), which is selected by depression of said Balance key, is printed immediately to the right of said balance. In this first operation of a balance transaction, as in debit and credit transactions, the No. 3 totalizer is automatically selected and conditioned for adding, so that the amount of the balance ($50.00) will be added therein, and also the mechanism shown in Fig. 3 selects and conditions the No. 2 totalizer for an adding operation, so that a total of the net balances will be accumulated therein.

After the first operation has been completed, the traveling carriage tabulates to the second columnar position, and in an automatic operation the balance and the identifying symbol are repeat-printed upon the second portion of the statement slip. After the second operation has been completed, the traveling carriage tabulates to the third columnar position, and in another automatic operation the balance and the identifying symbol are repeat-printed upon the third or triplicate portion 342.

It will be noted that the date is not recorded in balance transactions. This is a desirable condition and is effected by providing the No. 1 totalizer with the usual so-called "No-Total" or "star wheels" in the three positions corresponding to the three date actuators for the three rows of date keys. The star wheels retain the date actuators and their corresponding printing sectors in zero or non-printing position in the first operation to prevent printing of the date on the first portion of the statement slip, even though the date keys are depressed.

The No. 1 totalizer is not engaged with the actuators in the second and third operations and is therefore ineffective to prevent printing of the date in such operations. To overcome this condition, the No. 3 totalizer is provided with regular wheels in the positions corresponding to the date actuators, and in the first operation said actuators retain said No. 3 wheels at zero. Obviously the No. 3 date wheels will remain at zero in the second and third operations and will in turn retain the date actuators at zero to prevent the printing of the date upon the second and third portions of the statement slip.

From the foregoing description it will be seen that at the end of the week, A. Retailer owes Any Meat Company the sum of $50.00, and, upon collection of this amount, the collector gives the first portion 340 (Fig. 10) of the statement slip to the customer for his receipt and record and retains the second portion 341 thereof for his (the collector's) record, and the third portion 342 is retained by the Company as an office copy of the transactions of the current week.

The second group of recordings upon the three portions of the station slip illustrate by way of example the way of handling an account involving an overdraft or a credit balance in which the principal difference is in the series of credit balance operations.

In the second example, the debit and credit items are entered exactly as explained in connection with the first example, and, after the last debit item of $10.00 is entered, the operator, not knowing that the balance totalizer is in an overdrawn condition, attempts to depress the Balance key to initiate a balance transaction. This, of course, is impossible, as the mechanism shown in Fig. 8 locks the Balance key against depression upon the changing of the balance totalizer from a positive condition to a negative or overdrawn condition. Upon discovering that the balance totalizer is overdrawn, the operator moves the traveling carriage one step to the right to the "off-stop" position, which is determined by the left margin stop, and, while retaining the carriage in said position, depresses the No. 3 Subtract key 108 (Fig. 2) and then initiates a preliminary operation by depressing the Balance key 105. Movement of the carriage to the "off-stop" position causes all of the printing sectors to be locked against printing movement, so that no recording of this operation will be made upon the record material. Upon operation of the machine, the balance totalizer is cleared and the complementary or negative balance therein is simultaneously subtracted from the No. 3 totalizer and added into the No. 2 totalizer. This results in the true negative balance being entered in the No. 3 totalizer and subtracted from the No. 2 totalizer, which latter totalizer, as previously explained, accumulates a net total of all balances. At the end of the preliminary operation, the traveling carriage is allowed to tabulate into the first columnar position, in which the left-hand portion 340 of the statement slip (Fig. 10) is in alinement with the printing mechanism.

The first operation of the credit balance transaction is initiated by depression of the Credit Balance key 106 (Fig. 2), and said key causes the No. 3 totalizer to be engaged and disengaged in sub-total timing and simultaneously non-adds the No. 1 and the No. 2 totalizers, so that the true amount of the credit balance ($30.00) will be printed in the first portion of the statement slip. Likewise, depression of the Credit Balance key causes the symbol-printing sector to be positioned to print an identifying symbol (CR) immediately to the right of the credit balance entry.

At the end of the first operation in a credit balance transaction, the traveling carriage tabulates automatically to the second columnar position and in so doing initiates an automatic machine operation in which the true amount of the credit balance ($30.00) and the corresponding symbol (CR) are repeat-printed on the second portion of the statement slip. At the end of the second operation, the traveling carriage tabulates automatically to the third columnar position and in so doing initiates another automatic operation of the machine, in which the positive or true amount of the credit balance and the corresponding symbol are repeat-printed on the third or triplicate portion of the statement slip.

It is desirable that the data in connection with a credit balance transaction be printed in red, and this is effected by depression of the Credit Balance key 106, which shifts the ribbon color control shaft 329 (Fig. 2) to red printing position, and the shaft is retained in position by the finger 332, as explained earlier herein, to cause the three recordings of the credit balance to be in a distinctive color.

It will be noted that in credit balance transactions, as in regular balance transactions, the date is not printed on any of the three portions of the statement slip. This is effected in precisely the same manner as explained previously in connection with balance transactions.

If at the end of a particular business period, such as a day, for example, the operator wishes to know the total net balance, this may be obtained by totalizing or sub-totalizing the No. 2 totalizer, which accumulates a total of said net balances. Ordinarily the total net balance is not printed upon the statement slip shown in Fig. 10, but is printed upon another record or ledger card, which is retained as a part of the office record. In the present arrangement of the machine, the net balance is recorded only once upon the ledger slip, and this is effected by pressing the Non-Add key 111 in conjunction with the No. 2 Total key 107, which latter key initiates a series of machine operations in the first of which the No. 2 totalizer is totalized and the amount therein printed upon the record material. Inasmuch as the No. 1 and the No. 3 totalizers are non-added during the first operation, they remain in a zeroized condition during the second and third operations, and, as a result, nothing is printed upon the record material in these operations.

In net balance operations, it is desirable that the date not print, and this is effected by providing the No. 2 totalizer with "star wheels" in the positions corresponding to the date actuator racks, to retain said racks in zero position, so that, even though the date keys are depressed, the date will not be printed. The Non-Add key 111 positions the symbol-printing sector to print a non-add symbol immediately to the right of the recording of the total net balance.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a machine of the class described having a traveling carriage arranged to tabulate automatically from one columnar position to the next and having normally ineffective means to give the machine a cycle of operation, the combination of means, including a lever, to render the cycling means effective; power means to operate the lever; a latch to hold the lever against operation by the power means; means to disengage the latch from the lever; a member manually movable into and out of coacting relationship with the disengaging means to operate it; an element secured to the carriage in relation to a predetermined columnar position thereof; and means connected to the member and engageable by the element as the carriage tabulates into a predetermined columnar position to cause said member to operate the disengaging means, when said member is in coacting relationship therewith, to cause the machine to cycle automatically.

2. In a machine of the class described having a traveling carriage constructed and arranged to tabulate from one columnar position to the next and having normally ineffective means to drive the machine, the combination of power operated means to activate the driving means; means to retain the activating means in ineffective position; means including an element on the carriage and an element connected to the retaining means, said elements coacting as the carriage tabulates from one columnar position to the next to release said retaining means; means normally effective as the carriage is moving from said one columnar position to said next columnar position to hold the activating means in ineffective position; and means including a part on the carriage and a part connected to the holding means, said parts coacting when the carriage arrives in said next columnar position to render said holding means ineffective, to cause the machine to operate automatically.

3. In a machine of the character described capable of adding and sub-total operations and having record material supporting means, the combination of a totalizer; means to set up values to be entered in the totalizer; actuators for the totalizer, said actuators positioned by the setting-up means in adding operations and by the totalizer in sub-total operations; means positioned by the actuators to print values upon the record material; means normally effective to retain the actuators in zero position when no setting-up means is effective; means including an element shiftable in one direction to engage the totalizer with the actuators and shiftable in another direction to disengage said totalizer from said actuators; means effective in an initial machine operation to shift the element in said one direction to engage the totalizer with the actuators in add timing, said totalizer arranged to remain in engagement therewith at the end of machine operation; and means operated by the element during its movement in said one direction to move the zero retaining means to ineffective position at the beginning of subsequent machine operations so that the totalizer will be sub-totalized to effect repeat prints of the value entered therein upon the record material.

4. In a machine of the class described having a totalizer and means to set up values to be entered in the totalizer, the combination of actuators for the totalizer, said actuators positioned by the setting up means in adding operations and positioned by the totalizer in sub-total operations; means positioned by the actuators to record values; means to retain the actuators in zero position when no setting up means is effective; means to disable the retaining means at the beginning of sub-total operations so that the actuators may be positioned by the totalizer; selective means normally effective to render the disabling means ineffective; means to engage and disengage the totalizer with and from the actuators; means effective in an initial machine operation to cause the engaging means to engage the totalizer with the actuators in add timing to receive a value set up, said totalizer constructed and arranged to remain in engagement with said actuators at the end of machine operations; and means connected to the engaging means and operable upon an initial engaging movement thereof to actuate the selective means to cause it to render the disabling means effective to cause the zero retaining means to be moved to ineffective position so that in subsequent machine operations the totalizer will be sub-totalized to repeat the recording of the value.

5. In a machine of the class described arranged to print values on record material, said machine having a totalizer and means to set up values to be entered in the totalizer, the combination of actuators for the totalizer, said actuators positioned by the setting-up means in adding operations and by the totalizer in sub-total operations; means positioned by the actuators to print the values set up or the values taken from the totalizer; means to retain the actuators in zero position when no setting-up means is effective; means including a shiftable link to engage and disengage the totalizer and the actuators; means effective in an initial machine operation to shift the link to engage the totalizer with the actuators in add timing, said totalizer constructed and arranged to remain in engagement at the end of said initial operation; and means, including a member connected to the link and actuated by the shifting thereof, to move the zero retaining means to ineffective position in an operation immediately following the initial operation so that the totalizer will be sub-totalized to control the positioning of the actuators and the printing means to cause the value to be repeat-printed on the record material.

6. In a machine of the class described arranged to perform a series of uninterrupted operations for each transaction, said operations including an initial operation and subsequent operations, the combination of a balance totalizer for computing values; a working totalizer; means to set up values to be entered in the totalizers; actuators for the totalizers, said actuators positionable by the setting-up means in add operations and by the selected totalizer in sub-total operations; means normally effective to retain the actuators in zero position when no values are set up; means to engage and disengage the balance totalizer and the actuators; means to engage and disengage the working totalizer and the actuators; means effective in the first of the series of machine operations to selectively control the first engaging means to cause the balance totalizer to be engaged and disengaged in proper timing for the type of transaction; recording means positioned by the actuators, said means positionable under influence of the setting-up means or the balance totalizer in the first of the series of operations to record the value in connection therewith; means effective in the first of the series of operations to control the second engaging means to cause the working totalizer to be engaged with the actuators in add timing to enter therein the value computed in the balance totalizer, said working totalizer arranged to remain in engagement with the actuators at the end of the first operation and during the subsequent related operations; and means including a member connected to the second engaging means and actuated by engaging movement thereof, to move the zero retaining means to ineffective position in the subsequent related operations so that the working totalizer will be subtotalized to control the positioning of the actuators and the recording means to cause said recording means to repeat the recording of the value in said subsequent operations.

7. In a machine of the class described constructed and arranged to perform three uninterrupted and related operations for each transaction, the combination of a balance totalizer; a working totalizer; means to set up values to be entered in the totalizers; actuators for the totalizers, said actuators positioned by the setting-up means in add and subtract operations and by the totalizers in total operations; means effective when no setting-up means is effective to retain the actuators in zero position; means to move the zero retaining means to ineffective position; means to engage and disengage the balance totalizer and the actuators; means including a shiftable link to engage and disengage the working totalizer and the actuators; means connectable with the engaging means to operate them; means effective in the first of the uninterrupted operations to selectively control the connection of the first engaging means and the operating means to cause the balance totalizer to be engaged with and disengaged from the actuators in either add, subtract, or total-taking timing; recording means positioned by the actuators, said means positionable under influence of the balance totalizer in the first operation to record the value in connection therewith; means effective in the first operation to control the connection of the second engaging means and the operating means to cause the link to be shifted to engage the working totalizer with the actuators in add timing, to enter therein the value computed in the balance totalizer, said working totalizer arranged to remain engaged with the actuators at the end of the first operation; and means including a member connected to the link and actuated by the shifting thereof to render the moving means effective to move the zero retaining means to ineffective positions in the beginning of the second and third of the series of related operations so that the working totalizer will control the positioning of the actuators and the recording means to cause said recording means to be positioned to the value of the first operation to repeat said value.

8. In a machine of the character described arranged to perform a series of related operations for each transaction, the combination of operation control elements; means positioned by the control elements to print a character identifying the type of operation, said printing means arranged to normally be returned to a neutral position at the end of the initial machine operation; a totalizer; actuators for the totalizer; means to engage the totalizer and the actuators, said totalizer arranged to remain engaged at the end of the first of the series of related operations and during the remaining related operations; and means including coacting members, one operatively connected to the printing means and the other operatively connected to the engaging means and effective as long as the working totalizer is engaged with the actuators to retain the printing means in position to repeat the printing of the identifying character in the succeeding related operations.

9. In a machine of the character described arranged to perform an initial and subsequent related repeat operations for each transaction, to obtain several identical records of said transactions, the combination of control elements to control the initial operation; means including a shaft positioned by the control elements and a printing sector positioned by the shaft to print an identifying character of the transaction, said shaft and said printing sector normally arranged to be restored to a neutral position at the end of each machine operation; a totalizer; actuators for the totalizer; means to engage and disengage the totalizer and the actuators; means to control the engaging means to cause the totalizer to be engaged with the actuators in the initial operation, said totalizer arranged to remain in engagement with said actuators during the repeat operations; and means, including coacting members, one connected to the shaft and the other connected to and operating in conjunction with the engaging means to retain said shaft and the printing sector positioned as long as the totalizer is engaged, to print the identifying character in the succeding repeat operations.

10. In a machine of the character described arranged to perform a series of related operations including an initial operation and subsequent repeat operations, for each transaction, to obtain several identical records of said transaction, the combination of control elements to control the initial operation; a character-printing sector; a shaft operatively connected to the sector; connections between the shaft and the control elements, whereby said control elements position the sector to print a character corresponding to the transaction, said sector and connected parts arranged to be returned to a neutral position at the end of each machine operation; a retaining segment on the shaft; a totalizer; actuators for the totalizer; means to engage and disengage the totalizer and the actuators; means to control the engaging means to cause the totalizer to be engaged with the actuators in the initial operation and to remain engaged therewith in the repeat operations; and a retaining pawl operatively connected to the engaging means, so that movement of said engaging means to engage the totalizer will engage the pawl with the segment to retain the sector in position during the repeat operations to repeat the printing of the identifying character in said operations.

11. In a machine of the character described having a totalizer, actuators for the totalizer, and printing means, the combination of an inking ribbon having two portions of different colors, either portion of which is movable into coacting relationship with the printing means to make imprints of the appropriate color upon record material; means, including a shaft rockable to either of two positions, to control the movement of either portion of the ribbon into printing position; means effective in a certain type of operation to rock the shaft to one position to cause one portion of the ribbon to be moved to printing position, said shaft constructed and arranged to be rocked to another position near the end of machine operation to cause the other portion of the ribbon to be moved to printing position; means to engage the totalizer with the actuators, said totalizer arranged to remain engaged at the end of machine operation; and means rendered effective by the engaging means and continuing effective while the totalizer is engaged to yieldably rock the shaft to said one position each time it is rocked to said another position, to maintain the one portion of the ribbon in printing position.

12. In a machine of the class described constructed and arranged to perform credit balance operations and having a totalizer, actuators for said totalizer, and printing means, the combination of an inking ribbon having two colored portions, either portion of which is movable into coacting relationship with the printing means to make imprints of the appropriate color on record material; means to control the moving of the ribbon into coacting relationship with the printing means, said means normally effective to cause one portion of the ribbon to be so moved; means coacting with the control means in credit balance operations to cause the other portion of the ribbon to be moved into coacting relationship with the printing means; means to engage the totalizer with the actuators; and means connected to and operating in conjunction with the engaging means to retain the control means in position to cause the other portion of the ribbon to be moved into coacting relationship with the printing means as long as the totalizer is engaged with the actuators.

13. In a machine of the class described constructed and arranged to perform credit balance operations and having a totalizer, actuators for the totalizer, and printing means, the combination of an inking ribbon having two colored portions, either portion of which is movable into coacting relationship with the printing means to make imprints of the appropriate color on, record material; shiftable means to control the moving of the ribbon into coacting relationship with the printing means, said means normally effective to cause one portion of the ribbon to be so moved; means to shift the controlling means in credit balance operations to cause the other portion of the ribbon to be moved into coacting relationship with the printing means, said controlling means constructed and arranged to be restored to unshifted position near the end of each machine operation to cause the one portion of the ribbon to be returned into coacting relationship with the printing means; means to engage the totalizer with the actuators; and means connected to and operating in conjunction with the engaging means and coacting with the controlling means to cause the other portion of the ribbon to be returned into coacting relationship with the printing means as long as the totalizer is engaged with the actuators.

14. In a machine of the class described capable of performing credit balance operations and having a totalizer, actuators for the totalizer, and printing means, the combination of a two-color inking ribbon having a printing position for each color, said ribbon cooperating with the printing means to make imprints on record material; controlling means normally maintained in one position to cause the ribbon to be moved to one printing position to print data in one color; means effective in credit balance operations to move the controlling means to another position to cause the ribbon to be moved to another printing position to print data relating to said credit balance operations in another color, said controlling means constructed and arranged to be restored to said one position at the end of each machine operation; means to engage the totalizer with the actuators, said totalizer arranged to remain engaged at the end of machine operation; and means connected to and operating in conjunction with the engaging means and coacting with the controlling means, once it has been moved to said another position, to maintain it in said another position to cause the ribbon to be retained in said another position.

15. In a machine of the character described having a totalizer, actuators for the totalizer, and printing means, the combination of a two-color inking ribbon having a printing position for each color, said ribbon cooperating with the printing means to make imprints on record material; controlling means effective when in normal position to cause the ribbon to be moved to one printing position to print data in one color, but operable to cause said ribbon to be moved to another position; means to operate the controlling means to cause the ribbon to be moved to said another printing position, to print data in another color, said controlling means constructed and arranged to be restored to normal position near the end of each machine operation; means to engage the totalizer with the actuators, said totalizer arranged to remain engaged at the end of machine operation and in succeeding related operations; and means connected to and operating in conjunction with the engaging means to maintain the controlling means in operated condition as long as the totalizer is engaged with the actuators and irrespective of the restoring thereof, to cause the ribbon to be maintained in said another position in said succeeding related operations.

16. In a machine of the class described capable of an initial operation and subsequent related repeat operations for each transaction, said machine having a totalizer, actuators for the totalizer, and printing means, the combination of a two-color inking ribbon having a printing position for each color, said ribbon cooperating with the printing means to print identical data relating to the transaction in the initial and related repeat operations; controlling means effective when in normal position to cause the ribbon to be moved to one printing position to print data in one color, but operable to cause said ribbon to be moved to another position; means effective in the initial operation of the transaction to operate the controlling means to cause the ribbon to be moved to said another position to print data in another color, said controlling means constructed and arranged to be restored to normal position near the end of each machine operation; means to engage the totalizer with the actuators in the initial operation, said totalizer arranged to remain so engaged at the end of said initial operation and during the related repeat operations; and means connected to and operating in conjunction with the engaging means to maintain the controlling means in operated condition irrespective of the restoring thereof and as long as the totalizer is engaged, to cause the ribbon to be maintained in said another position in the related repeat operations to print the data in connection with the transaction in said another color.

17. In a machine of the class described capable of an initial operation and subsequent related repeat operations for each transaction, said machine having a totalizer, actuators for the totalizer, and printing means, the combination of a two-color inking ribbon having a printing position for each color, said ribbon cooperating with the printing means to print identical data relating to the transaction in each of the related operations in connection therewith; means including a shaft to control the movement of the ribbon to either of its two printing positions, said shaft effective when in one position to cause said ribbon to be moved to one printing position to print data in one color; means effective in the initial operation of a transaction to move the shaft to another position to cause the moving means to move the ribbon to another printing position to print the data in connection with said transaction in another color in the initial operation, said shaft arranged to be restored to said one position near the end of each operation; means to engage the totalizer with the actuators in the initial operation, said totalizer arranged to remain in engagement at the end of said initial operation and during the related repeat operations of each transaction; and means including a part on the shaft and a flexible finger on the engaging means coacting therewith, when the totalizer is engaged with the actuators, to return said shaft to said another position each time it is restored to said one position, to cause the data in connection with the transaction to be printed in said another color in said succeeding repeat operations.

18. In a machine of the class described capable of an initial operation and corresponding related repeat operations for each transaction to print identical data in corresponding portions of record material, said machine having a totalizer, actuators for the totalizer, and printing means positioned by the actuators, the combination of a bichrome inking ribbon having a black printing position and a red printing position, said ribbon cooperating with the printing means to print data relating the transactions; means including a positionable shaft to control the movement of the ribbon to either black or red printing position, said shaft effective when in one position to cause the ribbon to be moved to black printing position; a control element; means rendered effective by the control element in the initial operation of the transaction to move the shaft to another position to cause the ribbon to be moved to red printing position, said shaft arranged to be restored to said one position near the end of each machine operation; means to engage the totalizer with the actuators in the initial operation, said totalizer constructed and arranged to remain in engagement therewith at the end of said initial operation and during the corresponding repeat operations; a part on the shaft; and a flexible finger connected to and operating in conjunction with the engaging means and coacting with the part when the totalizer is engaged with the actuators to return the shaft to said another position each time it is restored to said one position to cause the ribbon to be maintained in red printing position during the initial operation and the corresponding related repeat operation of the transaction.

19. In a program control means for a machine of the class described, said machine having a traveling carriage arranged to tabulate consecutively from a first columnar position to succeeding columnar positions during a series of related machine operations, the combination of a totalizer; means to set up values to be entered in the totalizer; actuators for the totalizer, said actuators positioned by the setting-up means in the first of the related operations and by the totalizer in the remaining of the related operations; printing means positioned by the actuator; means to engage and disengage the totalizer and the actuators; means normally effective to disable the actuators; means operable by the setting-up means to render the disabling means ineffective; means to control the engaging and disengaging means in the first of the related operations to engage the totalizer and the actuators in add timing to enter the value set up in said totalizer and to cause said value to be recorded, said totalizer arranged to remain in engagement with said actuators at the end of the initial operation and during the remaining related operations; means rendered effective by the engaging means, when it operates to engage the totalizer and the actuators, and remaining effective as long as said totalizer is engaged, to render the disabling means ineffective; and means to initiate automatic operations of the machine when the traveling carriage tabulates from one columnar position to the next to cause the totalizer to control the positioning of the actuators and the printing means, to cause the value of the transaction to be printed in said succeeding columnar positions.

20. In a machine of the character described arranged to perform a series of related operations for each transaction to make several identical records of said each transaction, said machine having a traveling carriage for supporting record material, said record material having a columnar division corresponding to each of the series of related operations, said carriage arranged to tabulate automatically from one columnar position to the next each machine operation, the combination of a totalizer; means to set up values to be entered in the totalizer; actuators for the totalizer, said actuators positioned by the setting-up means in the first of the related operations and by the totalizer in the remaining of the related operations; recording means positioned by the actuators; means to engage the totalizer and the actuators; means effective in the first of the related operations to control the engaging means to cause the totalizer to be engaged with the actuators in add timing to enter the value set up therein and record said value in the first columnar division of the record material, said totalizer constructed and arranged to remain in engagement with the actuators at the end of said first operation and during the remaining related operations to control the positioning of the actuators and the recording means in said remaining operations; means effective when the setting-up means is ineffective to retain the actuators in a normal position; and means operated by the engaging means and effective as long as the totalizer is engaged with the actuators to render the retaining means ineffective, to cause said totalizer to position said actuators and the recording means in the remaining related operations to cause the value entered in the totalizer to be recorded in the corresponding divisions of the record material.

21. In a machine of the class described, arranged to perform a series of related operations for each transaction, said machine having a totalizer and actuators therefor, the combination of means including an element shiftable in one direction to engage the totalizer with the actuators and shiftable in another direction to disengage the totalizer from the actuators; means effective in the first of the series of related operations to shift the element in said one direction to engage the totalizer with the actuators, said totalizer arranged to remain in engagement with said actuators during the series of related operations; control elements to select and condition the totalizer for various transactions; means positioned by the control elements to print a symbol identifying the transactions, said printing means constructed and arranged to be returned to a normal position at the end of machine operation; a retaining member connected to the symbol printing means; and means including a pawl operated by the shiftable element during its movement in said one direction and coacting with the retaining member to retain the symbol printing means positioned during the series of related operations.

RAYMOND A. CHRISTIAN.
JESSE R. GANGER.
HENRY F. LANG.

REFERENCES CITED

The following references are of record in the file of this patent:

UNITED STATES PATENTS

| Number | Name | Date |
|---|---|---|
| 1,827,890 | Horton | Oct. 20, 1931 |
| 1,857,356 | Chase et al. | May 10, 1932 |
| 1,946,572 | Crosman | Feb. 13, 1934 |
| 2,012,317 | Muller | Aug. 27, 1935 |
| 2,088,662 | Ott | Aug. 3, 1937 |
| 2,238,517 | Colley et al. | Apr. 15, 1941 |
| 2,340,372 | Fettig | Feb. 1, 1944 |